United States Patent
Wigren

(10) Patent No.: US 8,494,550 B2
(45) Date of Patent: Jul. 23, 2013

(54) ADAPTIVE POLYGON COMPUTATION IN ADAPTIVE ENHANCED CELL IDENTITY POSITIONING

(75) Inventor: Torbjorn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 832 days.

(21) Appl. No.: 12/593,151

(22) PCT Filed: Mar. 27, 2007

(86) PCT No.: PCT/SE2007/050189
§ 371 (c)(1),
(2), (4) Date: Sep. 25, 2009

(87) PCT Pub. No.: WO2008/118052
PCT Pub. Date: Oct. 2, 2008

(65) Prior Publication Data
US 2010/0087198 A1 Apr. 8, 2010

(51) Int. Cl.
*H04W 4/00* (2009.01)
*H04L 12/42* (2006.01)
*H04L 12/403* (2006.01)

(52) U.S. Cl.
USPC ............... 455/456.1; 455/456.2; 455/456.3; 455/456.4; 455/456.5; 455/456.6; 455/446; 370/331; 370/332; 370/335

(58) Field of Classification Search
USPC ........... 455/456.1–456.6; 342/357.42, 357.43
See application file for complete search history.

(56) References Cited

U.S. PATENT DOCUMENTS

| | | |
|---|---|---|
| 5,508,707 A | 4/1996 | Leblanc et al. |
| 6,697,630 B1 | 2/2004 | Corwith |
| 7,072,666 B1 | 7/2006 | Kullman et al. |

FOREIGN PATENT DOCUMENTS

| | | |
|---|---|---|
| WO | 2004/023155 A1 | 3/2004 |
| WO | 2007/086784 A1 | 8/2007 |

*Primary Examiner* — Rafel Pérez-Gutiérrez
*Assistant Examiner* — Joshua Schwartz
(74) *Attorney, Agent, or Firm* — Coats & Bennett, P.L.L.C.

(57) ABSTRACT

A method for provision of position determination assisting data in a cellular communication network comprises establishing (204) of a cell relation configuration for a user equipment. The cell relation configuration comprises cell identities of cells, in which signals fulfill a specific radio condition criterion when received. The method further comprises performing (206) of a high-precision position determination for the user equipment. The establishing and performing steps (204, 206) are repeated a plurality of times. Positioning points belonging to the same cell relation configuration are clustered (208) and a polygon is associated (212) with each result cluster. The association (212) comprises encompassing of a result cluster by a polygon, altering of the polygon corners along defined paths to improve a predetermined criterion, and counteracting that polygon corners are gathering at a minor portion of a circumference. The method finally comprises creating (212) of position determination assisting data comprising a relation between the cell relation configurations and the polygon.

25 Claims, 16 Drawing Sheets

| CELL ID |
|---|
| ID1 |
| ID2 |
| ID3 |
| ID4 |
| ID5 |

| No | CELL ID |
|---|---|
| 1 | ID1 |
| 2 | ID3 |
| 3 | ID5 |
| 4 | ID4 |
| 5 | ID2 |

| No | CELL ID | TYPE |
|---|---|---|
| 1 | ID1 | OWN CELL |
| 2 | ID3 | ACTIVE |
| 3 | ID5 | ACTIVE |
| 4 | ID4 | IDENTIFY |
| 5 | ID2 | IDENTIFY |

| 8 | 7 | 6 | 5 | 4 | 3 | 2 | 1 | |
|---|---|---|---|---|---|---|---|---|
| 0 | 1 | 0 | 1 | NO. OF POINTS ||||  OCTET 1 |
| S1 |||||||| OCTET 2 |
| |||||||| OCTET 3 |
| |||||||| OCTET 4 |
| |||||||| OCTET 5 |
| |||||||| OCTET 6 |
| |||||||| OCTET 7 |

•
•
•

| Sn |||||||| OCTET 6n-4 |
|---|---|---|---|---|---|---|---|---|
| |||||||| OCTET 6n-3 |
| |||||||| OCTET 6n-2 |
| |||||||| OCTET 6n-1 |
| |||||||| OCTET 6n |
| |||||||| OCTET 6n+1 |

Fig. 7

ADAPTIVE POLYGON COMPUTATION IN ADAPTIVE ENHANCED CELL IDENTITY POSITIONING

TECHNICAL FIELD

The present invention relates in general to methods and systems for position determination of mobile terminals in a cellular communications network, and in particular to position determination involving cell areas.

BACKGROUND

All cellular communications systems are divided into cells, where User Equipments (UE) are served by one, or when in softer) handover several base stations. Each base station may serve UEs in more than one cell. The important point from a positioning and navigation perspective is that the cell where a specific UE is located is known in the cellular system. Hence, after determination of the geographical area covered by a specific cell, it can be stated that the UE is located somewhere within said geographical area, as long as it is connected and the reported cell identity of the serving cell is equal to the cell identity corresponding to the particular geographical area.

An example of positioning within a Wideband Code Division Multiple Access (WCDMA) cellular system operates briefly as follows, assuming that the positioning operates over the Radio Access Network Application Part (RANAP) interface. The procedures are however similar for e.g. the Global System for Mobile communications (GSM) and Code Division Multiple Access 2000 (CDMA 2000).

A message requesting a location estimate is received in the Serving Radio Network Controller (SRNC) over the RANAP interface. The quality of service parameters of the message is assumed to be such that the Radio Network Controller (RNC) selects the cell identity positioning method. The SRNC determines the serving cell identity of the UE to be positioned and retrieves a pre-stored polygon that represents the extension of the serving cell. The SRNC sends the resulting cell polygon back to the core network over the RANAP interface, using a cell polygon format in a location report message.

It should, however, be noted that due to the complexity of the radio propagation, the cell polygon format is only an approximation of the extension of the true cell. The selection of the polygon format is dictated by the need to have a reasonably flexible geographical representation format, taking e.g. computational complexities and reporting bandwidths into account.

Since the polygon format approximates the cell extension, the polygon is normally pre-determined in a cell-planning tool to represent the cell extension with a certain confidence. The confidence is intended to represent the probability that the UE is located within the polygon, conditioned on the fact that it is connected to the cell that is represented by the cell polygon. The underlying off-line calculation of the cell polygon can e.g. be based on coverage simulations of varying levels of sophistication. However, the end result is normally not very reliable when the confidence of the calculated cell extension is considered.

The accuracy of the cell identity positioning method is mainly limited by the size of the cell, something that prevents it from being used in more sophisticated navigation applications. Its main advantages include a very low response time as well as the fact that it is widely spread and always available where there is cellular coverage. The cell identity method is also straightforward to implement and has no UE impact. The advantages has lead to an interest for the development of Enhanced cell identity (E-cell ID) positioning methods that aim at enhancing the accuracy of the basic cell identity method at the same time as the advantages of the method are retained.

One principle for E-cell ID positioning aims at combining the cell extension model with a distance measure. Two possibilities towards this end are Round Trip Time (RTT) measurements and path loss measurements. The more accurate of these two alternatives is the RTT measurement. The path loss measurement suffers from shadow fading effects, which result in accuracies that are of the order of half the distance to the UE. In the RTT measurement principle, the travel time of radio waves from the Radio Base Station (RBS) to the UE and back is measured. The RTT method alone defines a circle around the RBS. By combining this information with the cell polygon, left and right angles of the circle can be computed.

Another idea for enhanced cell identity positioning has been to use pre-calculated maps of the regions where the UE is in soft(er) handover with one or several cells. Such areas are significantly smaller than the whole cell opening up for a better accuracy of the determined position. Normally these maps are pre-calculated in the planning tool, exactly as the ordinary cell polygons.

In some situations high-precision positioning is required. In the present disclosure, "high-precision positioning methods" are defined to denote positioning methods that have a potential to meet the North-American E-911 emergency positioning requirements. Methods that meet these requirements are capable of obtaining positioning accuracies of:

either (terminal based) 50 meters (67%) and 150 m (95%), or (network based) 100 meters (67%) and 300 m (95%).

Assisted Global Positioning System (A-GPS) positioning is an enhancement of the Global Positioning System (GPS). GPS reference receivers attached to e.g. a cellular communication system collect assistance data that, when transmitted to GPS receivers in terminals connected to the cellular communication system, enhance the performance of the GPS terminal receivers. Typically, A-GPS accuracy can become as good as 10 meters. Additional assistance data is collected from the cellular communication system directly, typically to obtain a rough initial estimate of the position of the terminal together with a corresponding uncertainty of the initial estimate. This position is often given by a cell identity positioning step.

The Uplink Time Difference Of Arrival (UTDOA) positioning method is based on time of arrival measurements performed in several RBSs of transmissions from the UEs. The signal strengths are higher than in A-GPS, something that enhances the ability to perform positioning indoors. The accuracy of UTDOA is expected to be somewhat worse than that of A-GPS though, mainly because the radio propagation conditions are worse along the surface of the earth than when GPS radio signals are received from satellites at high elevation angles.

A general problem with existing positioning methods based on cell-ID is that the accuracy of the determined positions is low. Furthermore, the confidence value is normally not determined with the best possible accuracy, with respect to the calculated cell area. Additionally, cells having uneven and anisotropic distributions of the probabilities for occurrence of a mobile terminal are difficult to handle appropriately.

SUMMARY

A general object of the present invention is thus to provide for methods, devices and systems giving possibilities for improved position determination accuracy. A further object is to provide for methods and devices providing positioning assisting data allowing for position determinations of a higher accuracy. Yet a further object of the present invention is to provide for methods, devices and systems operating with smaller distinguishable areas and areas of complex shapes or anisotropic dimensions. It is also a further object of the present invention to provide for methods, devices and systems which provides defined areas having a well established confidence value.

The above objects are achieved by methods, devices and systems according to the enclosed patent claims. In general words, in a first aspect, a method for provision of position determination assisting data in a cellular communication network comprises establishing of a cell relation configuration for a user equipment. The cell relation configuration comprises at least cell identities of cells, in which signals to/from the user equipment fulfil at least a specific radio condition criterion when received. The method further comprises performing of a high-precision position determination for the user equipment. The establishing and performing steps are repeated a plurality of times. Points that are results of the high-precision position determinations, belonging to the same cell relation configuration are clustered in separate result clusters and a polygon is associated with at least one of the result clusters. The associating step comprises encompassing of a first result cluster of the result clusters by a polygon, altering of the position of corners of the polygon along defined paths to improve a predetermined criterion while maintaining at least a predetermined percentage of the results of high-precision position determinations of the first result cluster within the polygon, and counteracting that corners of the polygon are gathering at a minor portion of a circumference of the polygon. The method finally comprises creating of position determination assisting data comprising a relation between the cell relation configurations and the polygon.

In a second aspect of the present invention, a method for radio network planning comprises obtaining of position determination assisting data provided according to the first aspect. The step of performing a high-precision position determination is performed on demand. The method further comprises evaluation of the position determination assisting data regarding actual radio propagation.

In a third aspect of the present invention, a method for determining a position of a user equipment in a cellular communications network comprises obtaining of position determination assisting data provided according to the first aspect, and establishing of a cell relation configuration for the user equipment. The cell relation configuration comprises at least cell identities of cells, in which signals to/from the user equipment fulfil at least a specific radio condition criterion when received. The method further comprises determining, by said position determination assisting data, of a polygon related to the cell relation configuration as defining an area in which the user equipment is positioned.

In a fourth aspect of the present invention, an arrangement for providing position determination assisting data in a cellular communications network comprises means for establishing a cell relation configuration for a user equipment. The cell relation configuration comprises at least cell identities of cells, in which signals to/from the user equipment fulfil at least a specific radio condition criterion when received. The arrangements further comprises means for performing a high-precision position determination for the user equipment, means for clustering points that are results of a plurality of the high-precision position determinations belonging to the same cell relation configuration in separate result clusters, and means for associating a polygon with at least one of the result clusters. The means for associating is arranged for encompassing a first result cluster of the result clusters by a polygon, altering the position of corners of the polygon along defined paths to improve a predetermined criterion while maintaining at least a predetermined percentage of the results of high-precision position determinations of the first result cluster within the polygon, and counteracting that corners of said polygon are gathering at a minor portion of a circumference of the polygon. The arrangement also comprises means for creating position determination assisting data comprising a relation between the cell relation configurations and the associated polygons.

In a fifth aspect of the present invention, an arrangement for determining a position of a user equipment in a cellular communications network comprises an arrangement for providing position determination assisting data according to the fourth aspect and means for establishing a cell relation configuration for the user equipment. The cell relation configuration comprises at least cell identities of cells, in which signals to/from the user equipment fulfil at least a specific radio condition criterion when received. The arrangement also comprises means for determining, by the position determination assisting data, a polygon related to the cell relation configuration as defining an area in which the user equipment is positioned.

In a sixth aspect of the present invention, a node of a cellular communications network comprises an arrangement according to the fourth or fifth aspect.

In a seventh aspect of the present invention, a cellular communications network comprises an arrangement according to the fourth or fifth aspect.

In an eighth aspect of the present invention, a computer readable medium comprises position determination assisting data provided according to the first aspect.

One advantage of the present invention is that a database of area definitions for cell relation configurations is built up adaptively and automatically. The accuracy of the cell identity positioning method is maximized within a certain confidence level, even for complex areas or areas having highly anisotropic dimensions, i.e. areas having a high aspect ratio. The area definition information is automatically refined, a fact that is useful e.g. when parts of the Radio Network (RAN) is re-planned.

BRIEF DESCRIPTION OF THE DRAWINGS

The invention, together with further objects and advantages thereof, may best be understood by making reference to the following description taken together with the accompanying drawings, in which:

FIG. 7 is an illustration of a 3GPP polygon message information element;

DETAILED DESCRIPTION

In the present disclosure "position determination assisting data" is used to define data that is used in cell-related activities in cellular communications system, such as radio network planning or positioning based on cell-ID. In particular, it may refer to the cell relation configuration and related area definitions used in the present disclosure. This should not be mistaken for "assistance data", which in the present disclosure is used solely in A-GPS discussions.

In the present disclosure, WCDMA systems are used as a model system. However, anyone skilled in the art realizes that the basic principles of the present invention are applicable to any cellular communication system. The invention is thus not limited to the exemplifying embodiments as such.

Figure 1:
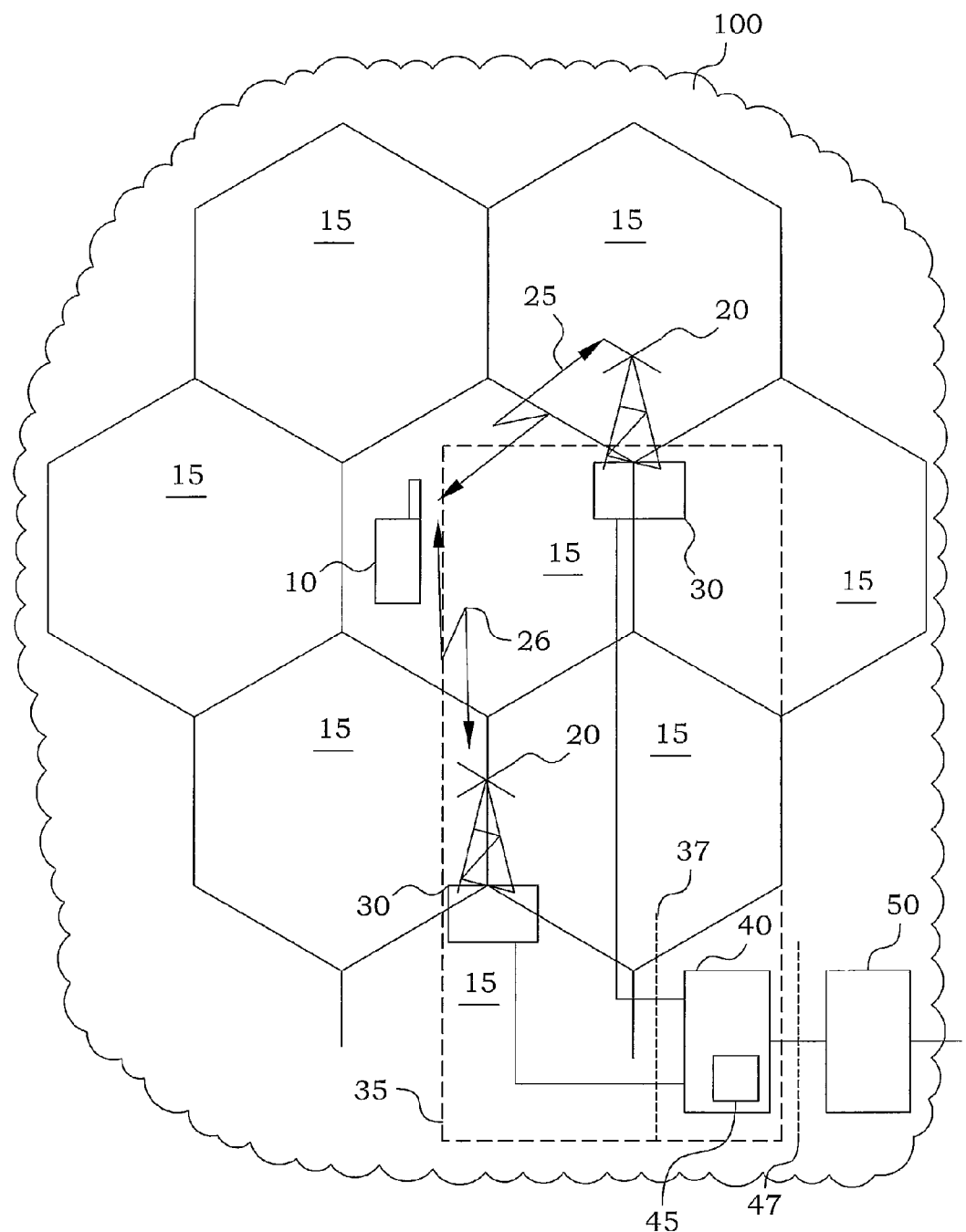
FIG. 1 is an illustration of a cellular communications system.

FIG. 1 illustrates a general WCDMA system 100. Radio base stations 30 (RBS) are spread over the coverage area of the system and serves antennas 20, which in this embodiment are sectorized antennas. A cell 15 is associated with each sector of the antennas 20, as the area in which connection to the communications system preferably is performed through that particular sector. The RBSs 30 are connected to a Radio Network Controller (RNC) node 40, which in a typical case comprises a positioning node 45. The UEs 10 and the RNC 40 communicates over the so-called RRC (Radio Resource Control) interface 37 that is transparent to the RBS 30. The RBSs 30 and the RNC 40 are nodes comprised in the UTRAN (Universal Mobile Telecommunication System Radio Access Network) 35. The RNC 40 is further connected to the Core Network (CN) 50 of the communications system 100 via a RANAP (Radio Access Network Application Part) interface 47.

A user equipment (UE) 10 is situated in the area covered by the cellular communications system 100. The user equipment communicates with the own radio base station 30 through signals 25. However, also signals 26 from and to neighbouring RBSs 30 may be possible to detect. If the neighbouring signals 26 are strong enough for supporting actual communication, the corresponding cell could be included in a so-called active set of cells, which participates in soft(er) handover. (By soft handover is meant the case where two different non-colocated RBSs are used, whereas softer handover refers to one RBS with several sectors.) A special case is when the UE is connected to two sectors of the same RBS, i.e. softer handover. However, for the purpose of the present invention, there is no substantial difference between soft and softer handover and both cases can be handled analogously. The signal 26 may in some cases be too weak to be included in the active set, but strong enough to allow for identification of the transmitting RBS. Such signals may e.g. be used for positioning purposes. Finally, neighbouring signals 26 may also be too weak to enable any use at all.

When a UE 10 is connected to a certain RBS via certain radio links, the UE 10 is likely to be situated within the associated geographical cell description. The cell area, in WCDMA defined by a polygon that describes the cell extension, is normally not determined with the best possible accuracy, with respect to the true extension of the cell. The approximate cell area is typically determined in connection with cell planning and may not correspond perfectly to the real situation. Normally, the actual confidence level of the cell area extension is not specified. Furthermore, radio conditions may also be altered after the cell planning has been preformed. It would therefore be advantageous to tune the confidence and the pre-calculated cell polygon for each cell, using field data. This can normally not be afforded though, in particular since the radio conditions may change with time. The present invention disclosure reveals a way to obtain such tuning automatically.

Figure 2A:
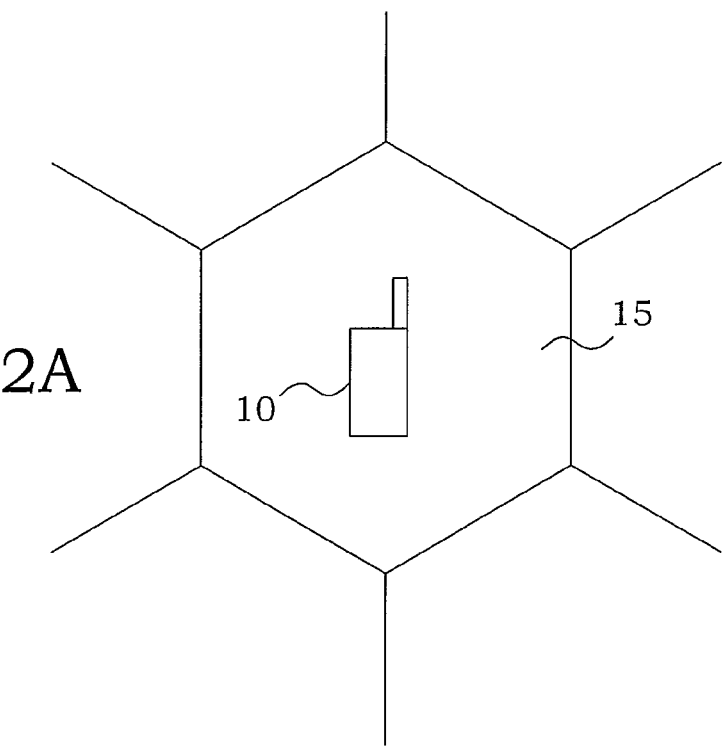
FIGS. 2A-E are illustrations of examples of division of a cell into smaller areas according to coverage from neighbouring cell signals.

FIG. 2A illustrates a cell 15, with a UE 10 connected. For simplicity in the coming explanations, the RBS is in this case assumed to be placed at the centre of the cell, a so-called omni-cell configuration. When the UE 10 is connected to the RBS, it can with a certain probability be determined to be present within the cell 15.

Figure 2B:
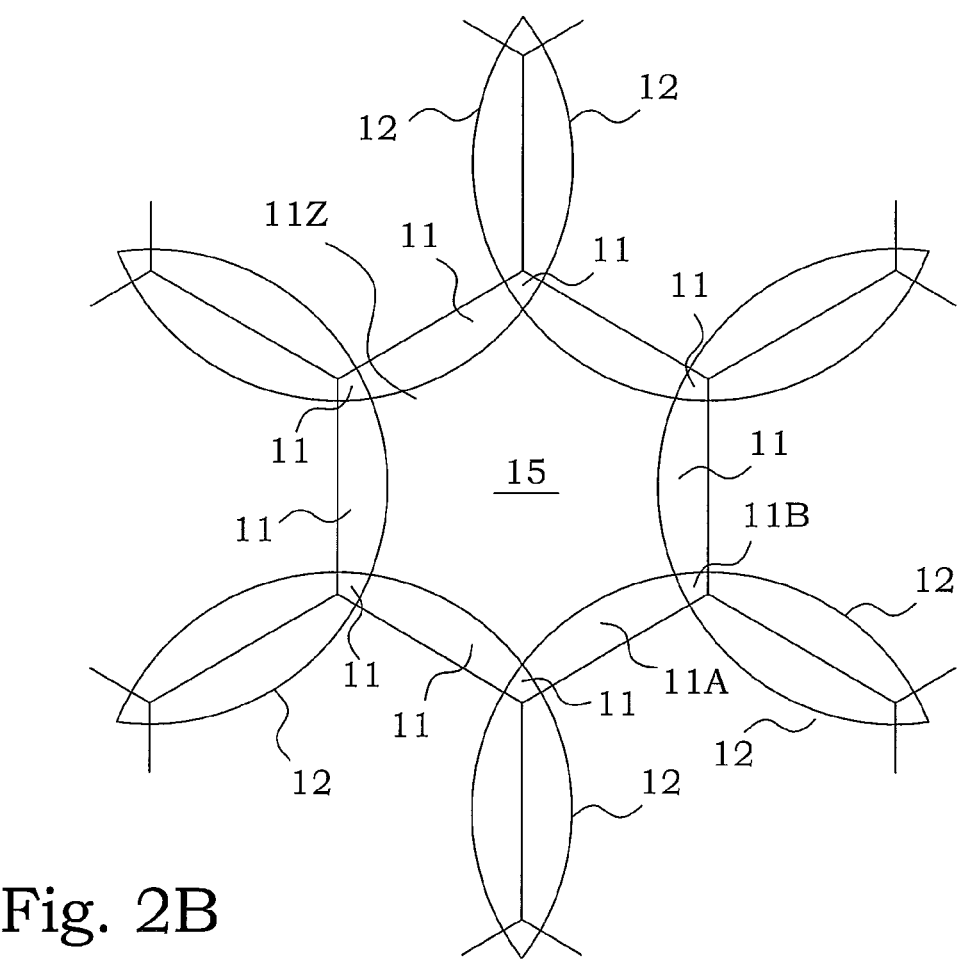

However, as mentioned briefly above, the UE may also be within radio range from other RBSs as well. In FIG. 2B, borders 12 of areas within which signals to/from a neighbouring RBS are strong enough to allow for soft(er) handover are indicated. In this oversimplified model, the borders 12 are drawn as circles, having their centre at a neighbouring RBS. It is easily seen that the borders 12 divide the cell 15 into smaller areas 11, 11A, 11B, 11Z. In the area 11Z, only signals from the own RBS 30 are useful. However, in e.g. area 11A, signals to/from one neighbouring RBS are also useful for soft(er) handover purposes and are thus included in the so-called active set of cells. In area 11B, signals to/from two neighbouring cells are strong enough and the active set then comprises two neighbouring cells. It can now easily be understood, that the content of the active set can be used for positioning purposes. By consulting the active set list, it can be determined in which of the part areas 11, 11A, 11B, 11Z, the UE 10 is likely to be situated.

However, most often, soft(er) handover information is not used for positioning purposes, probably since it is likely to be difficult to compute with a sufficient accuracy. According to the present invention, area definitions that describe any soft(er) handover regions are useful. In WCDMA, such area definitions can conveniently be polygon definitions. However, using prior art cell planning principles would normally not provide area definitions determined with the best possible accuracy, with respect to the true extension of any soft(er) handover regions. Furthermore, the confidence value of any soft(er) handover regions would normally, using prior art methods, not be determined with the best possible accuracy, with respect to any calculated soft(er) handover area. It would therefore be advantageous to tune the confidence and the pre-calculated cell polygon for each cell, using field data. This can normally not be afforded though, in particular since the radio conditions may change with time, even more than for the basic cell. However, the present invention reveals a way to obtain such tuning automatically.

Figure 2C:
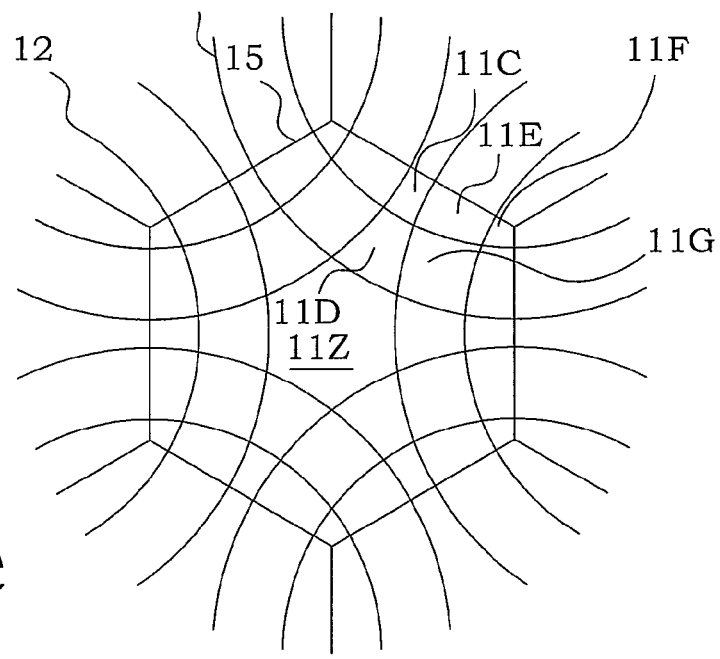

Signals from neighbouring RBSs can be utilized further. As mentioned above, even if the signals to and from neighbouring RBSs are not strong enough for allowing soft(er) handover, they may still be strong enough to enable determination of the identity of the transmitting RBS/UE. Corresponding set of cells is typically referred to as the detected set of cells. Also this information can be used for positioning purposes. In FIG. 2C, the cell 15 is once again illustrated. Now, not only borders 12 for soft(er) handover (of which only one is denoted by a reference number) are illustrated, but also borders 13 of areas in which the identity of the transmitting RBS or UE can be obtained in downlink or uplink, respectively, e.g. corresponding to the detected set of cells. The cell 15 is thereby further divided in even smaller part areas 11, 11C-G, 11Z. For instance, in area 11E, signals from one neighbouring RBS are, besides the signals from the own RBS, used for soft(er) handover, while signals from another neighbouring RBS only are used for identifying the transmitting RBS.

Figure 2D:
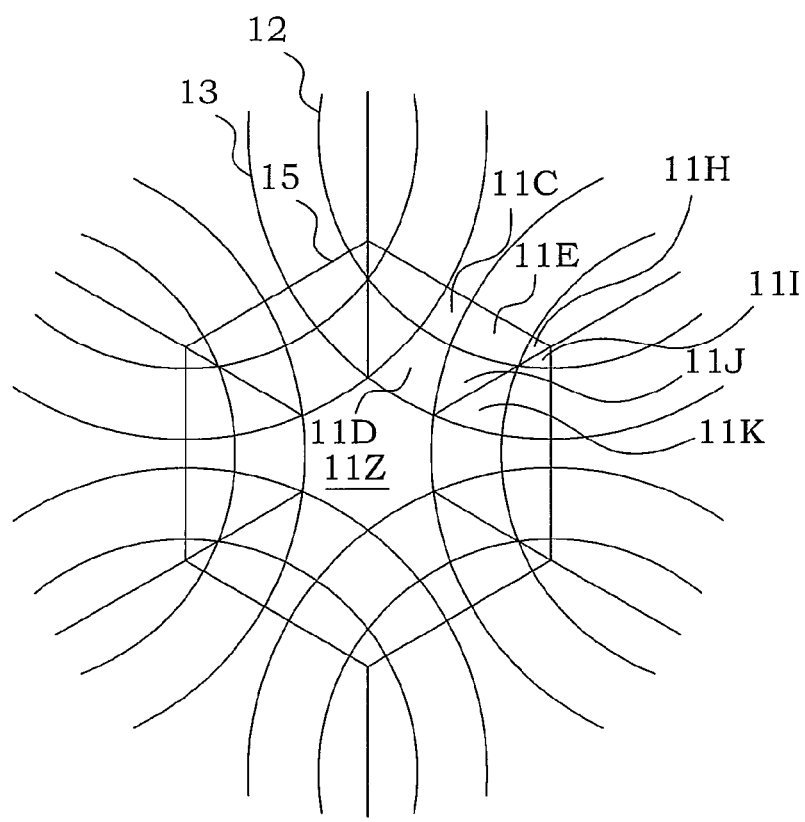

If not only the existence of signals of certain strengths are considered, but also the relative strengths as compared to other signals, an even finer division of the original cell can be achieved. In FIG. 2D, the part areas that involves signals from more than one neighbouring RBS are divided according to which signal that is the strongest. Areas 11H-K are thereby possible to define.

Figures 2E, 3A, 3B, 3C:
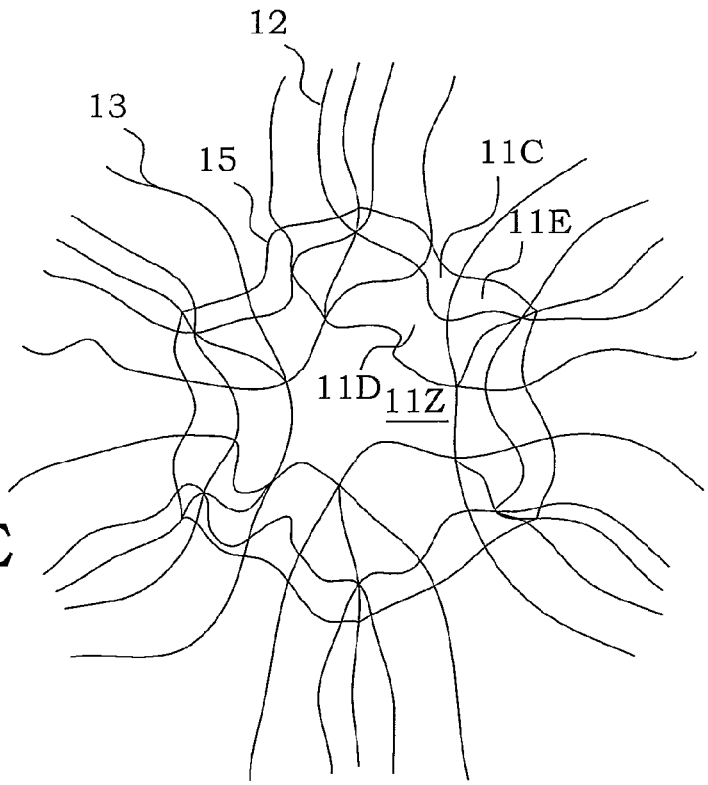
FIGS. 3A-C are illustrations of examples of cell relation configurations.

As mentioned above, the real situation is, however, not so ideal as the examples of FIGS. 2A-D may indicate. Instead, the borders 12, 13 are not easily determined and are typically non-circular. FIG. 2E illustrates a situation that could correspond to a real situation. Anyone skilled in the art then realises that any theoretical pre-determination of the areas 11, 11A-K, 11Z, is impossible in practice.

In the present invention, two types of information are connected to each other in order to achieve position determination assisting data; cell relation configuration and high-precision positioning data.

The first type of information is a cell relation configuration. This cell relation configuration corresponds to the divisions in the previous examples of FIG. 2A-E. The cell relation configuration comprises in a basic embodiment data representing the "own" cell as well as any neighbouring cell, in which the RBS corresponding thereto transmits/receives detectable signals to/from the user equipment in question which fulfil a certain criterion. In a typical view, the cell relation configuration can be considered as a list of cell identities corresponding to signals fulfilling a specific radio condition criterion with respect to a certain UE. FIG. 3A illustrates an embodiment of such a list. The first row corresponds to the own cell. The cell ID is "ID1". The UE can in this example also communicate with cells "ID2", "ID3", "ID4", "ID5". Each combination of cells will in this embodiment define a particular cell relation configuration.

FIG. 3B illustrates another embodiment of a cell relation configuration. Here, the relative signal strengths are taken into account, and the cells are thereby sorted in strength order. A signal to/from cell "ID3" is thereby stronger than signals to/from e.g. cells "ID5". This means that a cell relation configuration in this embodiment is not only dependent on which cells that are comprised in the list, but also in which order. There may even be a difference in strength order between uplink and downlink, which also can be utilised in defining areas.

Also other signal-strength related quantities can be utilised for defining the cell relation configuration, e.g. path loss and signal-to-interference ratio.

FIG. 3C illustrates another embodiment of a cell relation configuration. Here, the signal strengths are also classified. It can be seen that cell "ID1" is classified as "the own cell", and cells "ID3" and "ID5" are classified to be comprised in the active set of cells, i.e. they are utilised for soft(er) handover purposes. This means that a cell relation configuration in this embodiment is not only dependent on which cells that are comprised in the list and in which order, but also on the classification of the cells.

In the view of the above examples, anyone skilled in the art realizes that a cell relation configuration is easily obtainable for any UE that is situated within a coverage area of a cellular communications network.

The second type of necessary data is as mentioned further above high-precision positioning data. This can be derived in any possible way. UTDOA and A-GPS are mentioned earlier in the background, but other methods can be useful as well. One inventive idea is to collect relations between high-precision positioning data and cell relation configuration for the corresponding UE at the positioning instant. This is preferably performed by using measurements of opportunity, i.e. high precision measurements that would anyway be performed for some other reason. Alternatively, the measurements could be arranged on purpose. For instance, e.g. for the purpose of improved radio network planning, high-precision position measurement devices could be spread over a certain area in a planned manner. Positions are determined as well as cell relation configurations. Another alternative could be to regularly order user equipment capable of high-precision positioning to provide such measurements. For each possible cell relation configuration (i.e. in a simple view set of ordered cell identities), a measurement list is then setup. All high-precision measurements that are related to a specific cell relation configuration are then collected in one specific list of high-precision measurements. In other words, the high-precision positioning data are clustered dependent on the prevailing cell relation configuration. The measurements of one such list thus form a cluster of measurements that can be expected to be located in a specific geographical area. The clustering of results of the high-precision position determinations thus gives a number of separate clustered results. When a suitable number of high-precision positioning data points are clustered in one of the separate clustered results, it is possible to define an area which contains a pre-determined fraction of the high-precision positioning data points. It can then be concluded that a UE having a certain cell relation configuration is situated within the defined area with a confidence level corresponding to the pre-determined fraction.

In other words, a UE that not by itself has any high-precision positioning capabilities may utilise previous high-precision positioning of other UEs for achieving an improved accuracy in position determination.

It can be noticed that the achieved area definitions can be considerably different from the actual radio coverage. The reason is that areas having good radio conditions but never hosting any user equipments will tend to be excluded from the determined area. The associated area will instead be an area based on a combination of radio coverage properties and probability for user equipment occurrence.

Figure 4A:
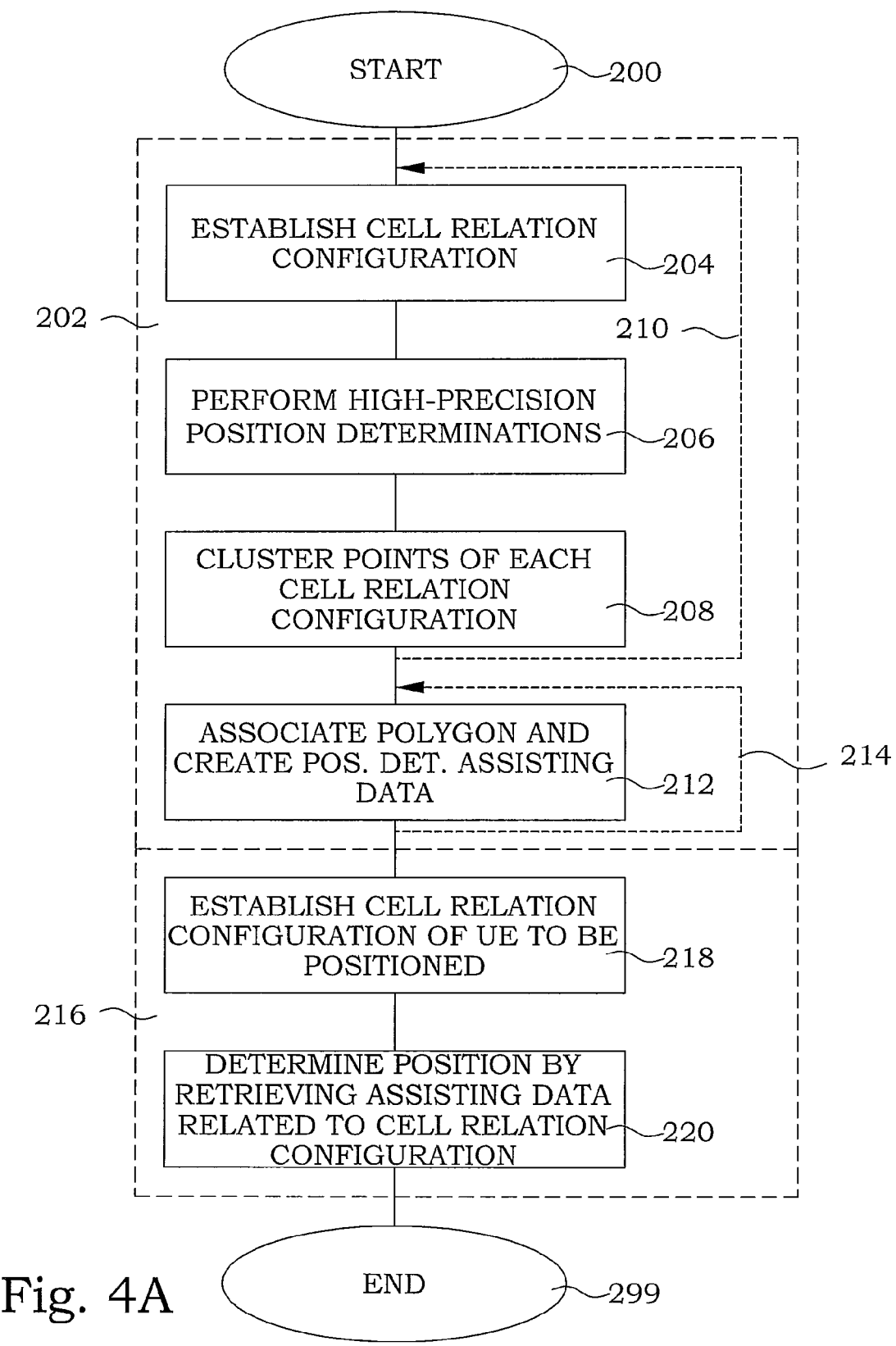
FIG. 4A is a flow diagram of the main steps of an embodiment of a method according to the present invention.

A basic idea upon which the present invention is based can also be illustrated by a flow diagram of the main steps of an embodiment of a method for providing position determination assisting data, illustrated in FIG. 4A. The procedure starts in step 200. The procedure first comes to a section 202 for providing position determination assisting data. This section starts with a step 204, in which a cell relation configuration for a particular UE is determined. The signals are typically registered and reported according to standard cellular communication system procedures and compiled to cell relation configuration. In step 206, a high-precision positioning of the UE is performed, using any suitable high-precision positioning method. In step 208, the high-precision positioning data is clustered dependent on the determined cell relation configuration. The steps 204 to 208 are repeated a number of times, as indicated by the arrow 210. A mathematical description of the clustering of points is presented in Appendix A.

When an appropriate number of measurement points are available for a certain cell relation configuration, the procedure may continue to step 212, in which an area is determined, which resembles the spatial distribution of the high-precision positioning data. Preferably, an area as small as possible is computed, which still contains a pre-determined fraction of the high-precision positioning data. In other embodiments, one may be satisfied with a fairly small area, even if the area is not the absolute mathematical minimum. A relation between a certain cell relation configuration and an area definition is thereby achieved. Inventive embodiments of step 212 are described further below. If further data is added by the steps 204-208, the step 212 may also have to be repeated as indicated by arrow 214. In particular, if the radio conditions are changing, permanently or for a longer period of time, the area definitions have to be re-calculated and adapted to the new situation. Each high-precision position measurement is then also preferably time stamped in order to make it possible to discard high-precision position measurements that are too old, and successively performing new area optimizations.

The time stamping can also be utilised in systems where the distribution of user equipments is likely to differ considerably between different times. For instance, if an office complex and a residence area are comprised close to each other, it is e.g. more likely to find the user equipments in the residence area during the nights. Such variations can be dealt with by discarding high-precision positioning data having a recording time of the day, of the week or of the year, that is considerably different from the present time. In other words, the clustering can be performed by only selecting measurements fulfilling a certain additional criterion. The area definitions can thereby be made time dependent.

The selection criterion for the clustering can also be made on other parameters. The Radio Access Bearer (RAB) could e.g. be one selection parameter. The coverage for different RABs can differ considerably, and the borders between different part areas can thereby change their position considerably. For instance, traffic transmitted by a 64 kbps link may have a completely different coverage area than traffic transmitted by a 384 kbps link. By also clustering the measurements e.g. with respect to the used RAB, will enable an improved positioning, since the area to be determined is unique for the actual RAB used.

The information about the RAB is a type of auxiliary information about circumstances of signalling that makes the selection criterion more area selective. In a general approach, other auxiliary information can also be utilised in an analogue manner. Similarly, there are also auxiliary measurements of signalling properties that can be performed and used as a part of the selection criterion. An example is e.g. auxiliary RTT measurements, which is discussed further below. The selection criterion can be thought of as an augmentation of the cell relation configuration.

The step 212 can be performed for one particular cell relation configuration, a group of cell relation configurations or all cell relation configurations as well as for different clustering selection criteria.

The lists of measurements are preferably organized hierarchically so that lists at higher levels can be constructed from lower levels in case the number of measurements at lower (more detailed) level would be insufficient for a reliable computation of a cell polygon.

When a UE is going to be positioned, the procedure enters into the section 216 for position determination. This section starts with a step 218, in which a cell relation configuration for the UE to be positioned is determined. This is typically performed in an analogue manner as in step 204. In step 220, the relation between a certain cell relation configuration and an area definition is used to provide an area in which the UE to be positioned is situated with a certain confidence. This confidence level corresponds to the pre-determined fraction used during the area optimization. The procedure ends in step 299. The accuracy of the positioning may in the best cases be enough for e.g. the North-American E-911 emergency positioning requirements. However, positions achieved in this manner should not be used to improve the area definitions according to the section 202.

Figure 4B:
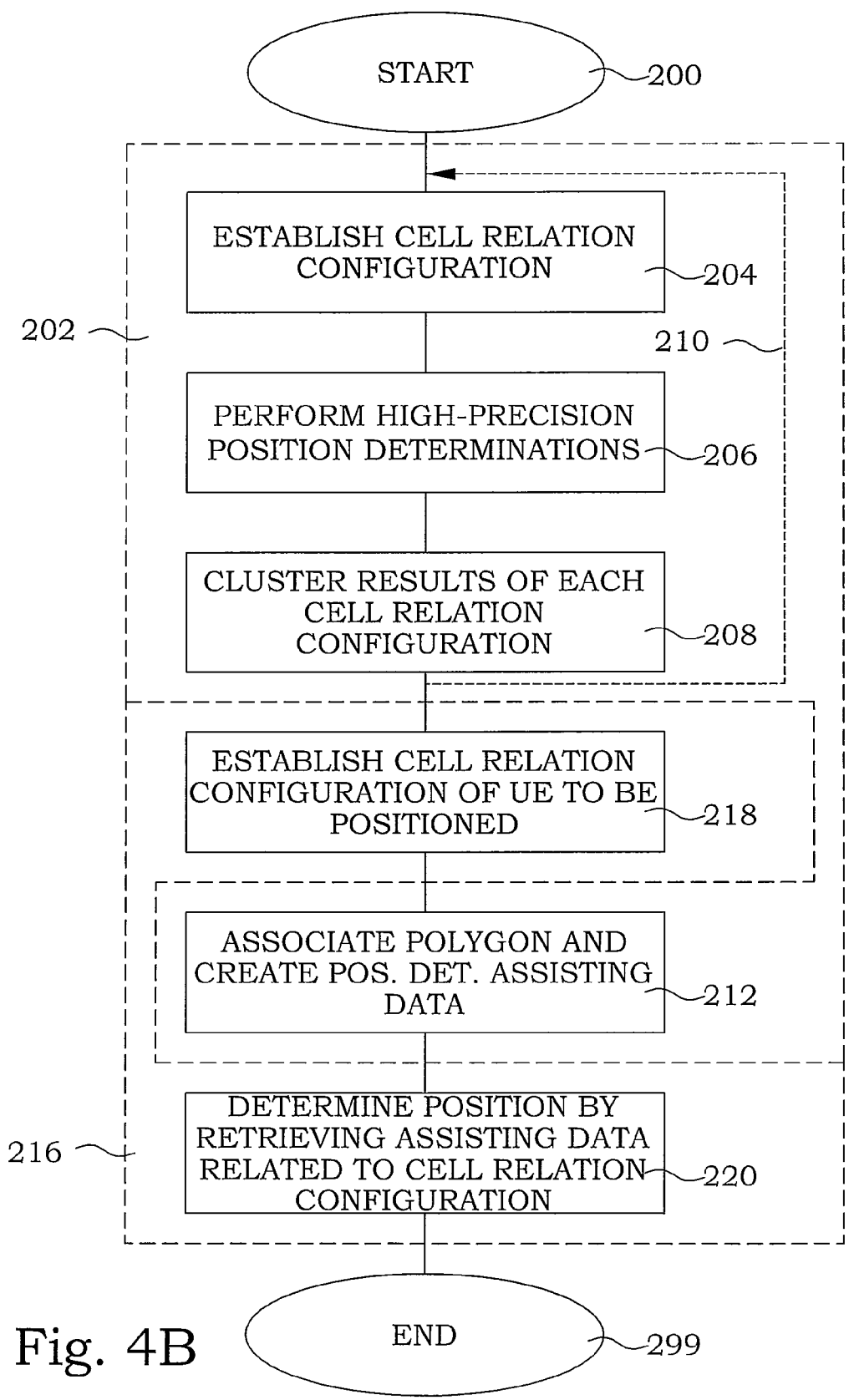
FIG. 4B is a flow diagram of the main steps of another embodiment of a method according to the present invention.

The timing of the different steps can be made somewhat differently. In FIG. 4B, a flow diagram of another embodiment of a method according to the present invention is illustrated. Here the two sections 202 and 216 are interleaved with each other. The step of optimising the area 212 is here triggered by the step of determining the cell relation configuration 218. The optimising step 212 is then preferably performed just for the cell relation configuration that was determined in step 218, in order to save time. If the relations are determined in advance, i.e. before the actual positioning request occurs, as in FIG. 4A, the positioning can be performed with a shorter delay. The embodiment of FIG. 4B instead ensures that the latest available data always is utilized.

Figure 4C:
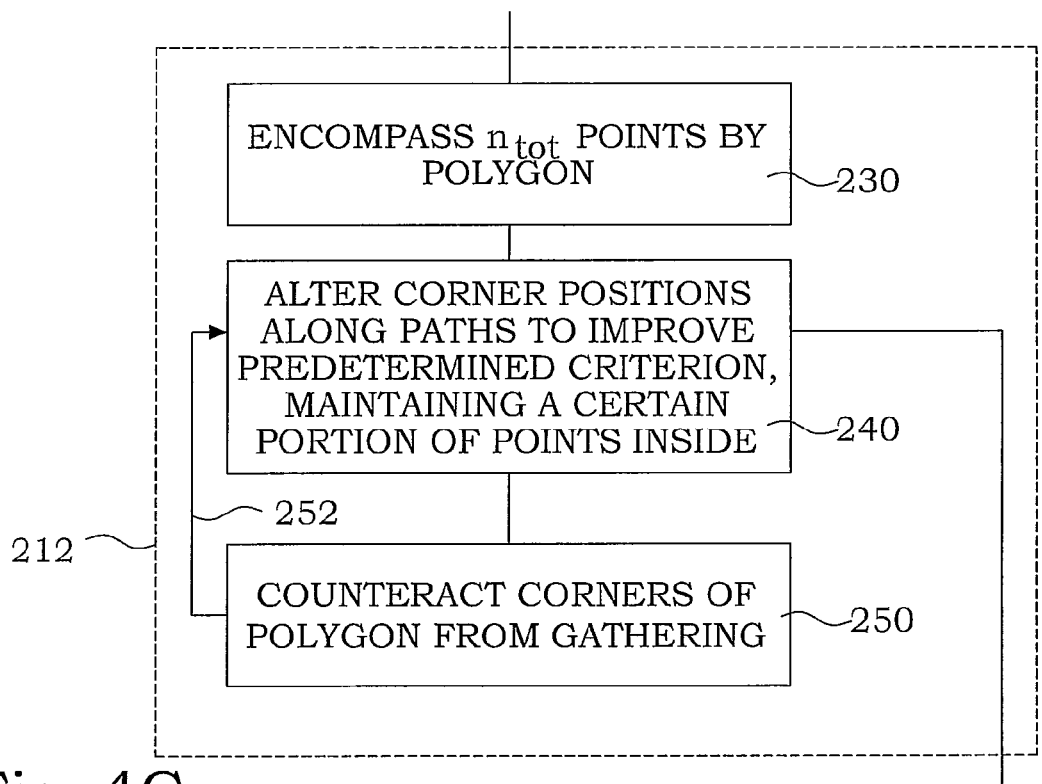
FIGS. 4C-D are flow diagrams of steps of embodiments of step 212 of FIGS. 4A-B.

The step of optimising the area 212 is considered as an important part of the present invention. In FIG. 4C, this step is described more in detail. In step 230, a first result cluster of the result clusters is encompassed by a polygon. All the high-precision measurement points, $n_{TOT}$, for the cell relation configuration in question are thereby encircled by an area border. $n_{TOT}$ is subsequently used as the inputted number of high-precision measurement points. In step 240, corner positions of the polygon are altered along defined paths to improve a predetermined criterion while maintaining at least a predetermined percentage of the inputted number of results of high-precision position determinations of the first result cluster within the polygon.

The shrinking procedure is then based on altering the position of one corner of the polygon at a time along a first defined path according to predetermined routines or rules. Typically, these rules allow for exclusion of a predetermined number of high-precision position determinations from the interior of the shrinking polygon. Preferably, the corner capable of giving the best improvement according to a predetermined criterion is selected to be moved in each step. The predetermined criterion can e.g. be an as large area reduction as possible. The predetermined criterion can alternatively be an as large alteration distance as possible. In particular, the corner selection can be decided by making tentative alterations of each corner and check what improvements on the predetermined criterion they will cause. This corner altering step is then repeated until only a predetermined percentage of the high-precision position determinations of the cluster remains within the polygon.

In a particular embodiment of the present invention, the altering of the polygon corner allows one of the high-precision position determinations to be placed outside the polygon, but not two of the high-precision position determinations. This typically brings one of the clustered high-precision position determinations to be placed on or in the vicinity of a connection line between the altered corner and a neighbouring corner.

In a simple procedure, which is operable on most cell shapes and situations, the defined path could be a straight line between the present corner position and a centre of gravity of the high-precision position determinations, i.e. the result cluster within the polygon. However, there are situations where such an approach will give an uneven distribution of the corners around the polygon.

In a case where clustered points of results extend relatively uniformly in all directions, an initial polygon having corners at a circle encompassing the clustered points operates satisfactorily. An optimised area will then be defined by a polygon having corners that are spread out fairly evenly over the circumference.

Figure 5:
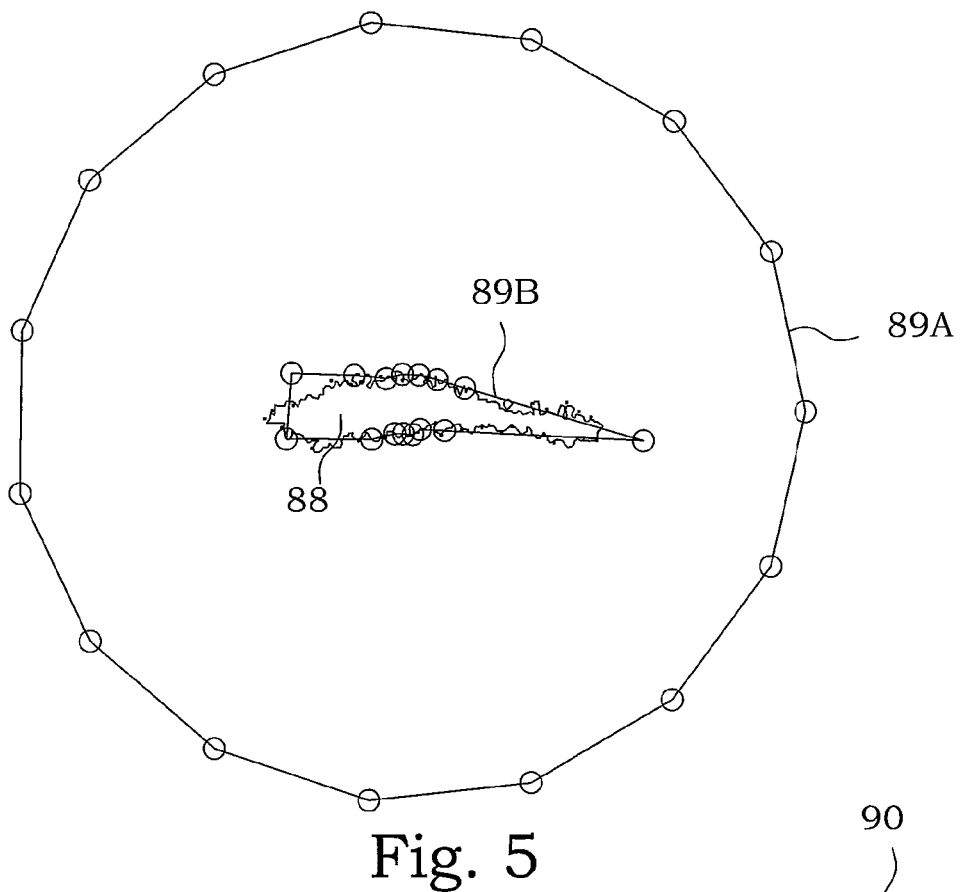
FIG. 5 is an illustration of corner points gathering at limited portions of a polygon.

However, in case of result clusters having complex shapes or areas having highly anisotropic dimensions, i.e. areas having a high aspect ratio, the situation may sometimes not be so good. FIG. 5 illustrates a polygon 89B calculated to encompass an elongated result cluster 88. An initial polygon 89A had its corners positioned at a circle. Most corner points of the resulting polygon 89B are moved far towards the center of gravity of the result cluster 88. Since the region has a high aspect ratio, the result is that many points quickly converge to a small region in the middle, close to the center of gravity of the result cluster 88. Very few polygon corner points remain for modeling of more distant parts of the result cluster 88.

To that end, in step 250 of FIG. 4C, actions for counteracting that corners of the polygon are gathering at a minor portion of a circumference of the polygon are performed. In the present embodiment, step 250 is performed repetitive or interleaved with the altering step 240, as illustrated by the arrow 252.

Figure 4D:
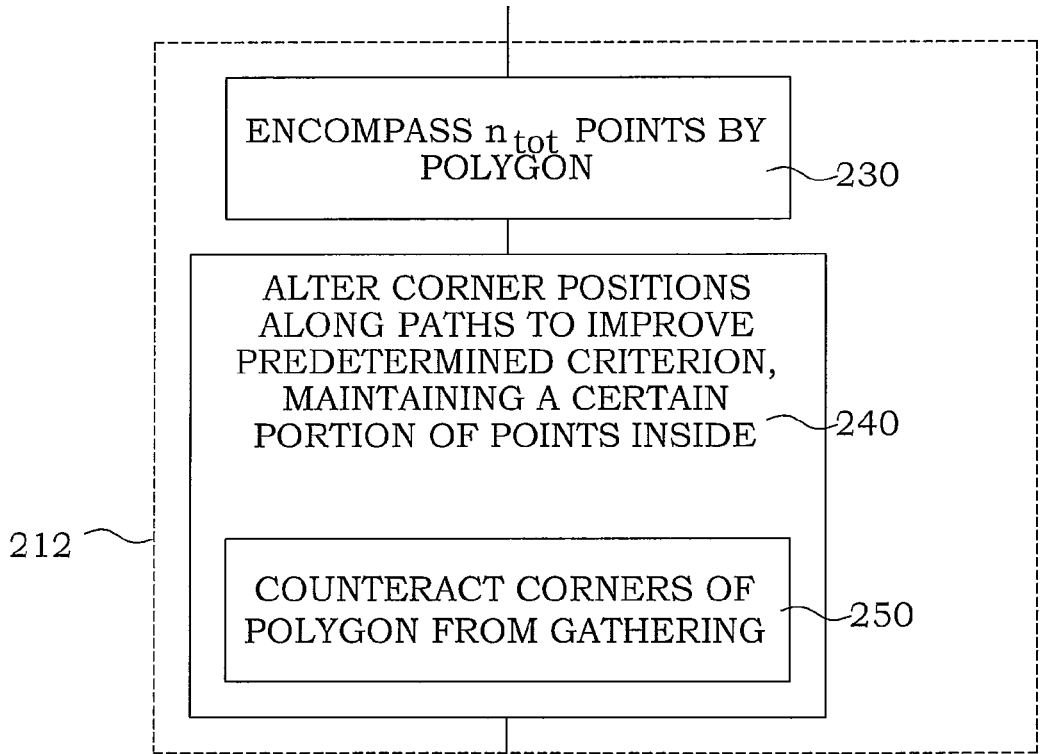

In FIG. 4D, another embodiment of the step of optimising the area 212 is illustrated. Here, the counteracting step 250 constitutes an integrated part of the altering step 240, i.e. the altering step is configured in such a way that corner gathering will not be possible.

Figure 4E:
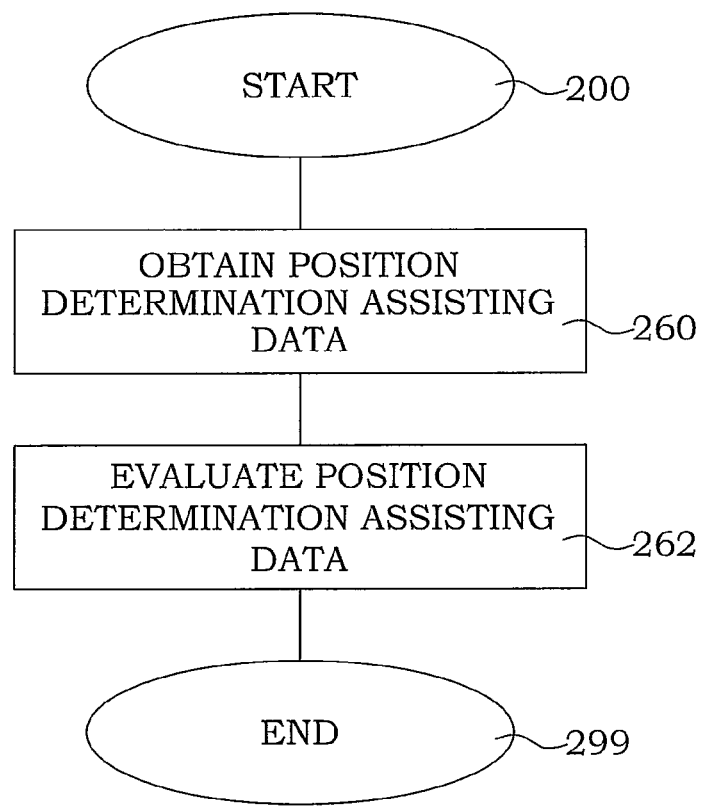
FIG. 4E is a flow diagram of steps of an embodiment of another method according to the present invention.

The above methods for providing position determination assisting data can be utilized in different situations. For instance, a method for performing radio network planning can be based on such providing method. This is schematically illustrated in FIG. 4E. The procedure starts in step 200. In step 260, position determination assisting data are obtained according to the above discussed principles. The step of performing a high-precision position determination is thereby typically performed on demand. This gives the opportunity to ascertain that a number of high-precision position determinations from points of interest within the cell area are achieved. In step 262, the position determination assisting data are then evaluated regarding the actual radio propagation. The procedure ends in step 299.

The procedure of FIG. 4E as well as the user equipment positioning described e.g. in FIG. 4A are based on position determination assisting data. This data may in principle be determined at a different time and/or different place compared to the subsequent steps. It would therefore in principle be possible to base these procedures on position determination assisting data comprised in a computer readable medium. The actual provision of the data, e.g. any computer treatment, could, however, take place at another time and/or at another position.

Figure 6:
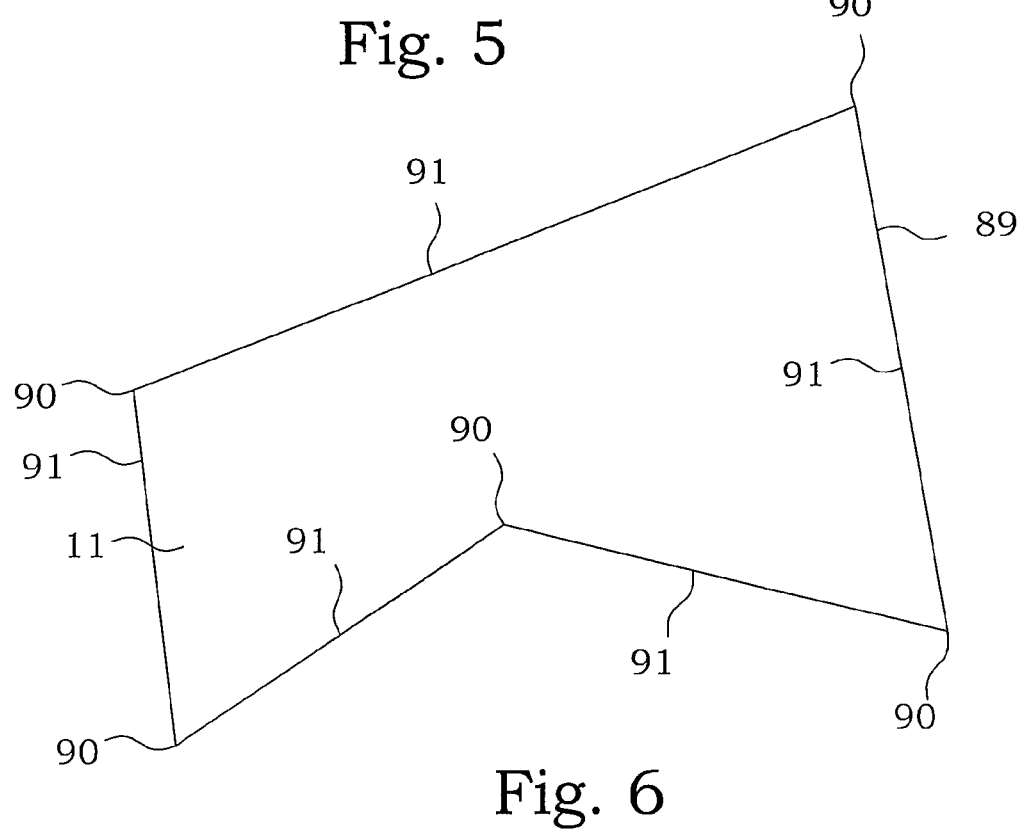
FIG. 6 is an example of a cell polygon.

In several systems, among these the WCDMA (Wideband Code Division Multiple Access) system, the preferred representation of the geographical extension of the cell is conveniently given by a cell polygon format. The extension of a cell is described by 3-15 corners of a closed polygon which does not intersect itself. The format is two-dimensional and the corners are determined as pairs of longitudes and latitudes in the WGS84 geographical reference system. An example is illustrated in FIG. 6. There, an example of a cell polygon 89 with corners 90 is illustrated. The RBS (Radio Base Station) is typically located close to one of the corners 90 of the cell polygon 89 said RBS serves. 3GPP systems provide for a messaging format for cell polygons. FIG. 7 illustrates the used 3GPP Polygon message IE (Information Element). This IE is present in the LOCATION REPORT message that is returned to the core network over the RANAP interface after a successful cell identity positioning.

When the present invention is used as cell-ID positioning method, a re-calculated polygon, rather than the pre-calculated polygon, that corresponds to the specific identity of the cell is reported over RANAP or Iupc (a logical interface between a RNC and a SAS within the UTRAN). Note that since the re-calculated polygons are consistent with the reporting format, the invention fits directly into the existing positioning interfaces.

If the present invention is used as enhanced cell identity positioning, making use of soft(er) handover active sets or detectable cell sets, a similar reporting can take place. In case there is a re-calculated polygon stored for the determined cell relation configuration, then the re-calculated polygon is selected and reported over RANAP or Iupc. Again, the invention fits directly into the existing positioning interfaces.

The area definition data should be organized so that it can be efficiently addressed using cell relation configuration information. In this way, fallback areas covering replacement regions can be found whenever areas for certain regions have not been computed. Note that this situation may occur e.g. because of insufficient measurement statistics.

For instance, in case no polygon is computed for the specific cell relation configuration, then the hierarchical structure of the stored cell relations and area definitions is exploited in some way. One alternative is to disregard the last cell identity of the cell relation configuration and look for the re-calculated polygon for the so reduced cell relation configuration. In case there is a re-calculated polygon for this reduced cell relation configuration, then this polygon is reported over RANAP or Iupc. In case there is still no polygon computed then the second last cell identity of the cell relation configuration is removed and the procedure repeated. This procedure can continue up to top level, where the cell relation configuration corresponds to the serving cell. In case there would still not be a re-calculated polygon, the pre-calculated polygon can be used. It should be noted that there are many alternative strategies that are possible here.

There are a number of possible embodiments of steps 240 and 250. A few of them will be discussed here below. In a first group of embodiments, the defined path is a curve through the original corner position and a single point.

Figure 8:
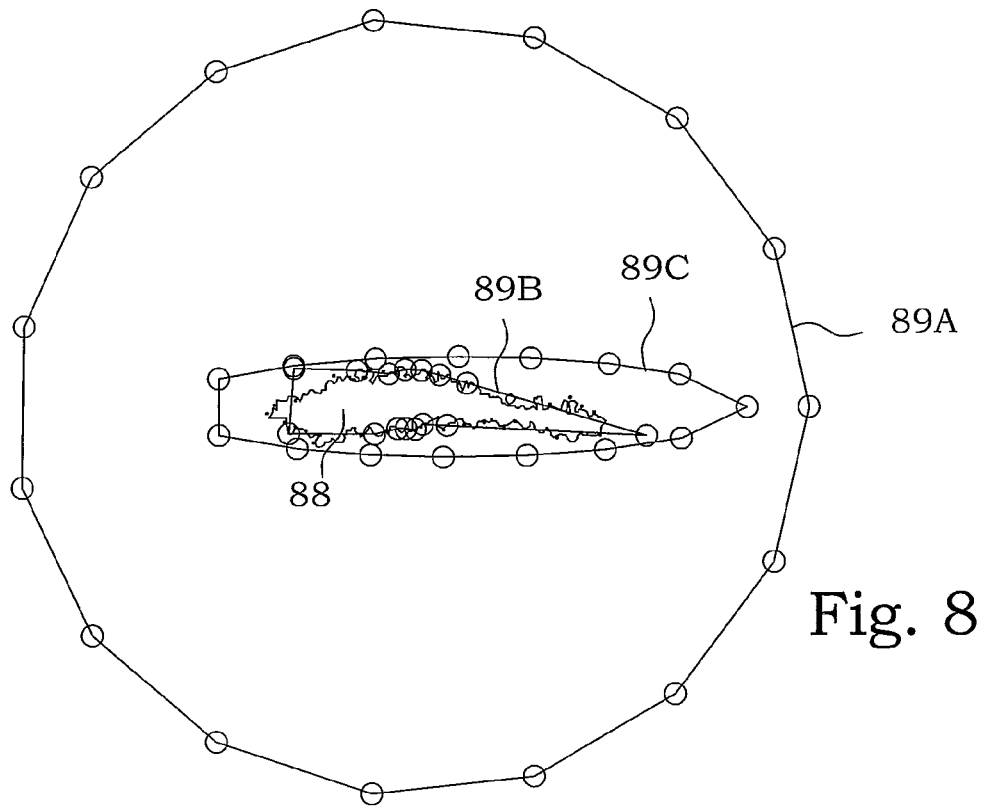
FIG. 8 is an illustration of a result of reinitiation of corner points of a polygon according to one embodiment.

In a first embodiment, the single point is a centre of gravity for the results of high-precision position determinations of the first result cluster within the polygon. The step of counteracting comprises in this embodiment at least one reinitiation of a polygon encompassing results of high-precision position determinations of said first result cluster. The reinitiated polygon is in the first embodiment a polygon having corners distributed evenly along a circumference of the polygon of the previous iteration. An example is illustrated in FIG. 8. The reinitiated polygon 89C encompasses only remaining results of high-precision position determinations of the first result cluster, i.e. points inside the polygon 89B resulting from altering the original polygon 89A. Results already excluded are thereby not included again. A simple example of reinitiated polygon shape is a polygon where the corners are situated on an ellipse. An appropriate shape of the ellipse is deductible from the distribution of the corners of the altered polygon 89B. This approach may eventually end up in a final polygon encompassing also a few points that are excluded in a previous stage. However, it is believed that in most cases the number of "falsely" incorporated points is small.

Figure 9:
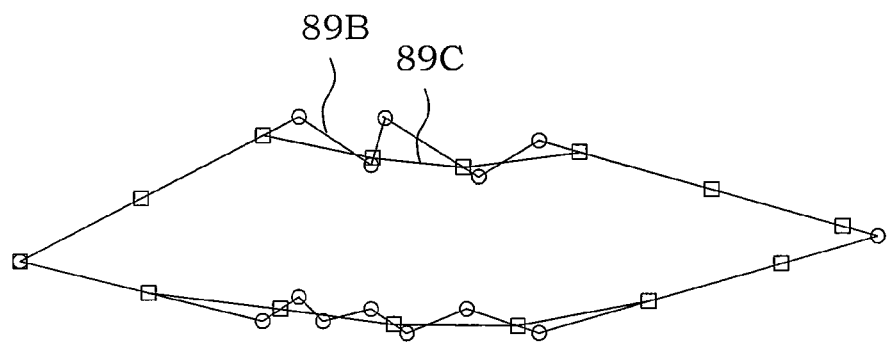
FIG. 9 is an illustration of another embodiment of reinitiation of corner points.

A second embodiment is also based on motion to a single point, and for instance towards the centre of gravity, and also on a reinitiation. However, to avoid any unintentional incorporation of excluded points, the reinitiated polygon is a polygon having corners distributed evenly along a circumference or boundary of the previous polygon. This is illustrated in FIG. 9, where a previous polygon 89B has corners, illustrated by circles, situated too close. A reinitiated polygon 89C is created by spreading out the corners along the previous polygon 89B such that the length of the path along the previous polygon 89B between each "new" corner, illustrated by squares in the figure, is the same. The step of counteracting then also comprises recalculation of which points in the original cluster are situated within said reinitiated polygon 89C. This redistribution hence calculates new corner coordinates for each polygon corner, whereby the redistribution preferably being uniformly distributed in distance around the boundary of the estimated polygon. In this way, the approximate shape of the polygon of the previous iteration step is preserved, however, single points that have been excluded in a previous stage may be included again.

Figure 13:
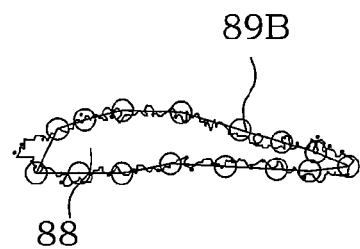
FIG. 13 is an illustration of a result of reinitiation of corner points of a polygon according to the other embodiment.

A more detailed description of the second embodiment is found in Appendix B. FIG. 13 illustrates the final results after polygon shrinking, polygon reinitiation and further polygon shrinking.

Both the first and second embodiments are based on polygon reinitiations. Such reinitiations may be performed according to different criteria. One possibility is to make the reinitiation intermittently, e.g. after a predetermined number of iterations of altering the polygon corners. The number of iterations of the shrinking polygon algorithm, since the start or the latest re-initiation is then tracked. Re-iteration may be performed at any time, however, preferably, no re-initiation should be performed before all corners of the initial polygon have moved at least once.

Another approach is to define a measure of uneven corner distribution and perform the reinitiation when such measure exceeds a predetermined threshold value. A measure of uneven corner distribution can be defined in many different ways. One non-exclusive example is:

$$\sigma = \frac{\max_i d_i^p}{\min_i d_i^p}.$$

where $d_i^p$ are distances between adjacent corners. When $\sigma$ is large, a situation where re-initiation is rewarding is likely.

The decision on when to perform a re-initiation of the polygon can also be based on any combination of the above described approaches.

A typical example, where elongated areas may occur is when RTT measurements are utilized in AECID positioning. This is particularly true for large values of WIT in combination with cells that are reasonably wide. In a third exemplifying embodiment, illustrated in FIG. 14, the step of counteracting comprises selection of the single point 92 as a point outside the polygon 89 encompassing the result cluster 88. In other words, by selecting an appropriate point outside the result cluster 88, one can thereby insure that the minimum distance between two polygon corners 90 is kept above a certain level. The point 92 towards which the corners 90 are moved, e.g. in case of large enough values of RTT measures, is preferably placed at the position of the RBS antenna that serves the cell. The movement principle is then arranged so that the polygon corner points that are closer to the RBS than the result cluster 88, locally, move away from the RBS and the polygon corner points that are further away to the RBS than the result cluster 88, locally, move towards the RBS.

In such an embodiment, the original polygon 89 can also be selected in many ways. One possibility is to select a polygon 89 having points located at two circular or ellipsoid arc sections 93 centered at the selected single point 92. The initiation principle may be to initiate the polygon 89 on two ellipsoid arcs 93 with side angles 94, 95 equal to the minimum and maximum side angles, modulo $2\pi$. One ellipsoid arc (of zero thickness) is located outside the result cluster, with respect to the serving RBS, and one ellipsoid arc (of zero thickness) is located between the result cluster and the ellipsoid arc.

The third embodiment is described somewhat more in detail in Appendix C.

Figure 15:
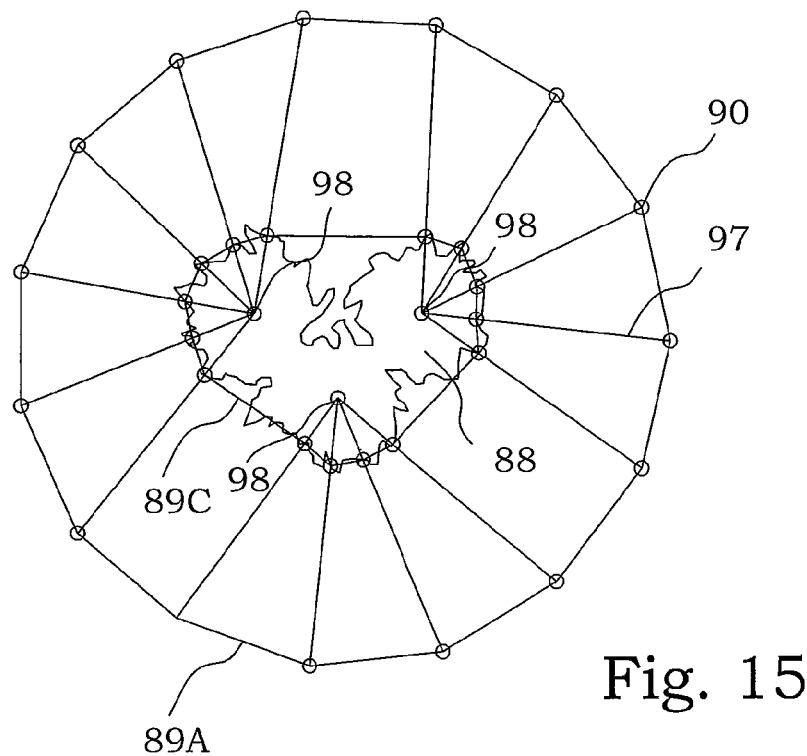
FIG. 15 is an illustration of polygon shrinking aiming at more than one point.

In a fourth embodiment, illustrated in FIG. 15, the defined paths 97 are selected somewhat differently. Here, a plurality of points 98 within the first result cluster area 88 is provided as tentative goal for the defined path 97. The defined path 97 is then a curve through the original corner position 90 of the polygon 89 and a first point within the first result cluster 88. The counteracting action here comprises selection of a closest point of the plurality of tentative goal points.

Figure 16:
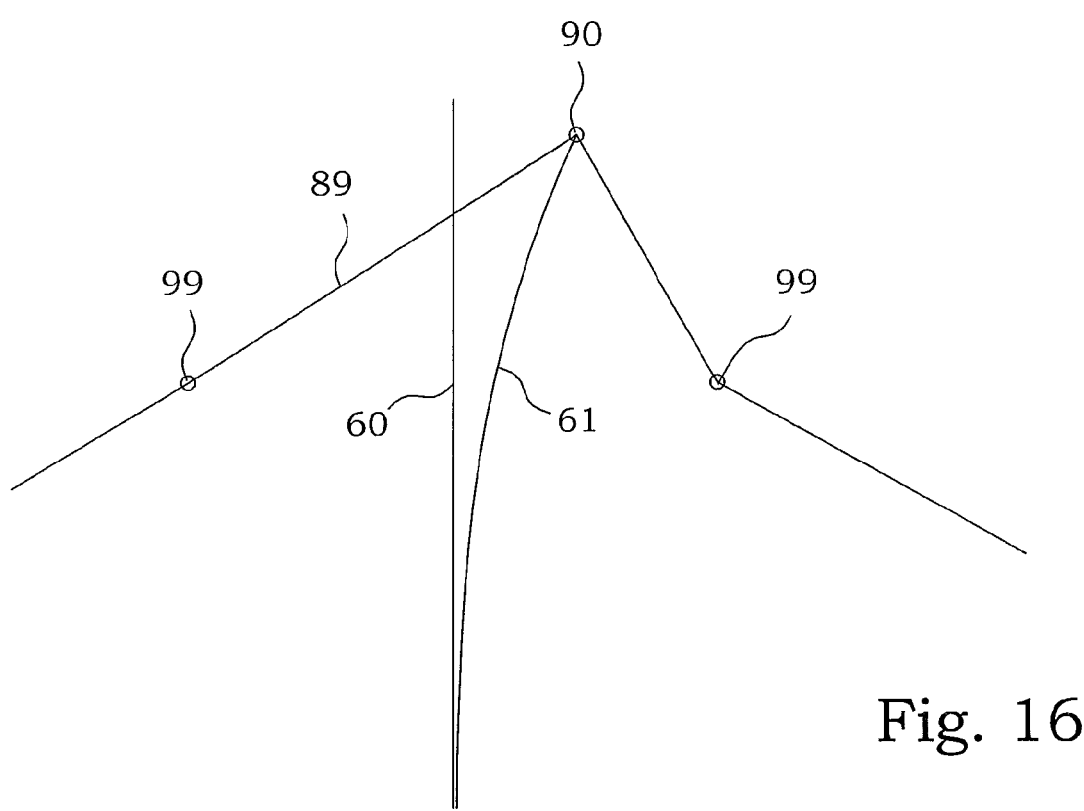
FIG. 16 is an illustration of polygon shrinking aiming towards same distances between neighbour corners.

In a fifth embodiment, illustrated in FIG. 16, the procedure aims to keep the distance to neighbouring corners 99 equal. Each corner 90 has two corner neighbours 99. There is a straight line 60 between these two corner neighbours 99 that defines points having the same distance to both points, i.e. a path that is equidistant to the two closest neighbouring corners 99. In this embodiment, such a straight line 60 is the optimum choice for placing an altered corner point with respect to the issue of spreading out the corner points. However, also the area minimizing has to be considered. The defined path 61 is therefore selected to be a curve asymptotically closing up to the line 60 that is equidistant to the two closest neighbouring corners 99.

Figure 17:
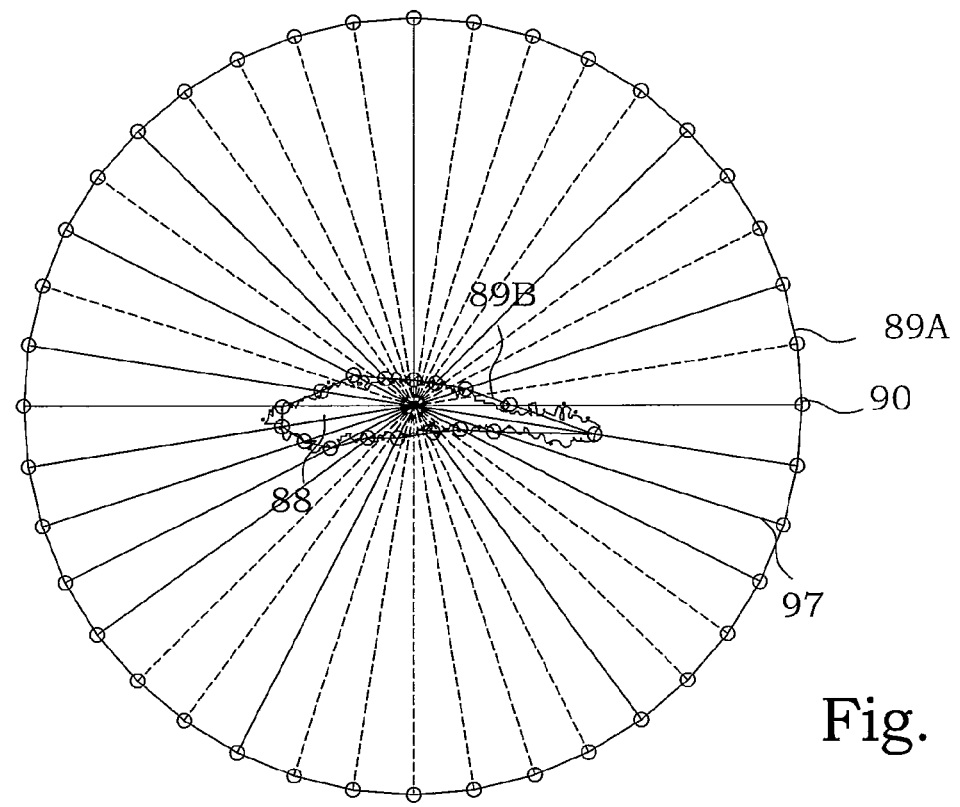
FIG. 17 is an illustration of polygon shrinking using deletion of closely positioned corners.

In a sixth embodiment, illustrated in FIG. 17 an excess of corner points 90 are used for an initial polygon 89, when the shrinking polygon algorithm is run. The counteracting of closely situated corner points 90 is simply performed by deletion of at least one polygon corner among polygon corners gathering at a minor portion of a circumference of the polygon 89. In other words, when the corners come too close, some of them are deleted, illustrated as crosses. In FIG. 17, it is seen that most of the final points situated close to the centre of gravity are deleted, leaving just a few corners, denoted by circles. If the final polygon still has too many corners to be practically used, a final reduction can be performed, e.g. to fit into the reporting over RANAP using the polygon format with 3-15 corner points.

Figure 18:
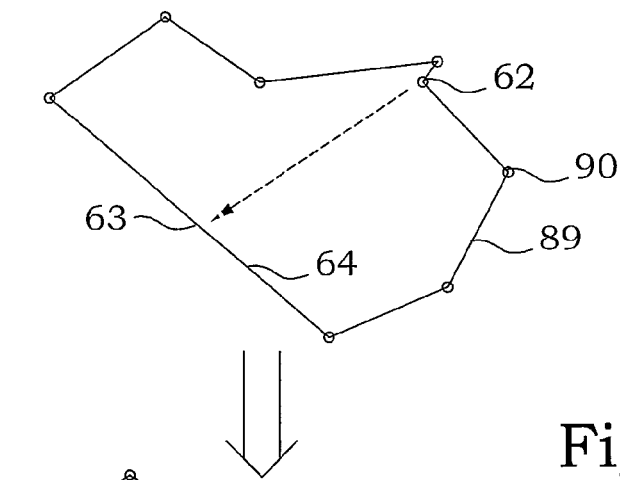
FIG. 18 is an illustration of polygon shrinking using moving of closely positioned corners.
Figure 18:
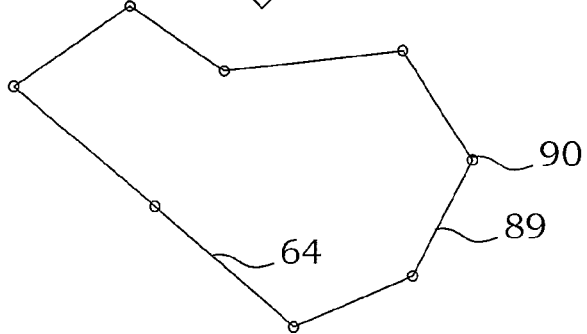

In a seventh embodiment, as illustrated in FIG. 18, corner deletion is again used when corners 90 come too close. However, in this embodiment, for each deleted corner 62, a new corner 63 is introduced at another place along the polygon. Preferably, a new corner 63 may be introduced at the middle of the longest side 64 of the polygon. The number of corners is thereby always constant, however, a corner 90 may now and then be moved from one position, where the local density of corners 90 is high, to another, where the local density of corners 90 is low.

Figure 19:
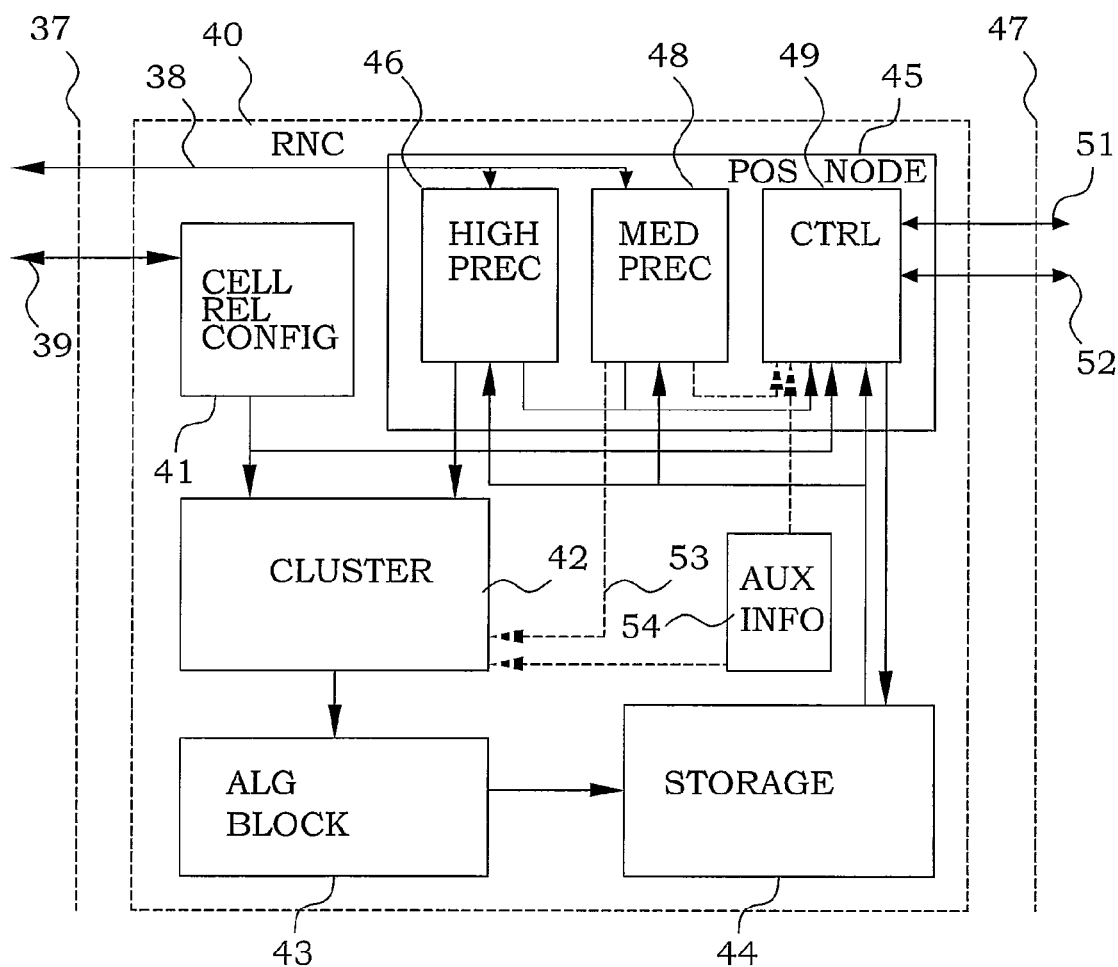
FIG. 19 is a block diagram of the main parts of an embodiment of a node according to the present invention.

FIG. 19 is a block diagram of an embodiment of an arrangement for providing position determination assisting data in a cellular communication network. The arrangement of the present embodiment comprises a positioning node 45 and related functionality. In the present embodiment, which is assumed to be comprised in a WCDMA system, such functionality is preferably comprised in the RNC 40. Another possibility is to implement the invention in the SAS node (e.g. an Ericsson SMLC) on the other side of the Iupc interface 47. Still another possibility is to log measurements and perform the algorithms in OSS-RC or even a completely external node. New interfaces and/or information elements in existing interfaces allowing for exchange of detected cell sets and measured high-precision position determination results may then be necessary.

In the case the position determination assisting data, i.e. the relations between the cell relation configurations and the associated areas are produced in an external node, the information has to be provided to a positioning node in order to assist in position determination procedures. The position determination assisting data can then preferably be stored at a computer readable medium, and supplied to the positioning node in a suitable manner, e.g. by downloading the content over a communication link or simply by providing a data memory device having the data stored therein.

In the present embodiment, the RNC 40 communicates with UEs, transparently via RBSs, using the RRC interface 37. In the present context, at least two information types are of interest; positioning measurements 38, in particular high-precision positioning measurements, and neighbouring cell signal measurements 39, e.g. handover measurements. The neighbouring cell signal measurements 39 are provided to a cell relation configuration determining section 41, establishing a cell relation configuration for a particular user equipment. In a particular embodiment, the cell relation configuration determining section 41 can be based on a prior-art active set functionality. As described further above, the cell relation configuration comprising at least cell identities of cells, in which signals to or from the user equipment fulfil at least a specific radio condition criterion when received. The determined cell relation configuration of a particular user equipment is provided to a clustering section 42.

The other important piece of information, the positioning measurements 38, is provided to the positioning node 45. The high-precision positioning measurements are provided to a high-precision positioning section 46, i.e. a means for performing a high-precision position determination for the user equipment in question, which high-precision positioning section 46 e.g. can comprise UTDOA or A-GPS based positioning. Other positioning measurements, e.g. cell ID or RTT positioning measurements are in the present embodiment provided to a medium-precision positioning section 48. The outcome of the analysis of the high-precision positioning measurements, i.e. high-precision positions is provided to the clustering section 42.

The clustering section 42 is a means for clustering points being results of a plurality of the high-precision position determinations belonging to the same cell relation configuration in separate result clusters. A high-precision position is thereby associated with a corresponding cell relation configuration. The measurements are clustered depending on the cell relation configuration and in particular embodiments also on other selection criteria such that auxiliary information and/or auxiliary measurements, in particular recording time, utilised RAB and/or RTT measurements. RTT measurements could then e.g. be provided by the medium-precision positioning section 48 as indicated by the broken arrow 53. Auxiliary information, such as time or utilised RAB, and other auxiliary measurements can be provided by an auxiliary information section 54. This auxiliary information section 54 can be arranged to provide the information internally in the node and/or be arranged to achieve the information from outside.

The clusters of positions for a certain cell relation configuration and in some embodiments selected within a specific time interval or using a specific RAB are provided to an algorithmic block 43. In the algorithmic block 43, area definitions are calculated. One important objective of the present invention, to compute an area that describes each cluster of measurements, at a specified confidence level, is performed in the algorithmic block 43. In the WCDMA case, the preferred area definition is a polygon defined by 3 to 15 corner coordinates. The algorithmic block 43 is thus a means for associating a polygon with at least one of the result clusters. In a particular embodiment, the algorithmic block 43 provides polygons such that the probability that a given fraction of high-precision measurements of a cluster are located in the interior of the polygon. The algorithmic block 43 is, according to the above described principles, arranged for encompassing a first result cluster of the result clusters by a polygon, altering the position of corners of the polygon along defined paths to improve a predetermined criterion while maintaining at least a predetermined percentage of the results of high-precision position determinations of the first result cluster within the polygon. The algorithmic block 43 is further arranged for counteracting corners of said polygon from gathering at a minor portion of a circumference of the polygon. This algorithmic block 43 preferably performs repeated re-calculations of polygons, for all measurement clusters with a sufficient number of recent enough high-precision measurements. The area definitions are provided to an area storage 44, where polygons representing a hierarchically organized set of cell relation configurations are stored. The stored polygons are then used by positioning algorithms of the system. The storage 44 is thus a means for creating position determination assisting data comprising a relation between the cell relation configurations and the associated polygons. The data structure of the stored polygons preferably contains a list of pointers covering each relevant cell relation configuration. Each such pointer points to a corresponding 3-15 corner polygon, computed repeatedly as described above. The data structure preferably also contains a time tag for each polygon that defines the time when the polygon was computed.

The arrangement of FIG. 18 is also an arrangement for determining a position of a user equipment in a cellular communications network. This includes the arrangement for providing position determination assisting data described above. When a position determination according to the principles of the present invention is requested, a cell relation configuration is determined in the cell relation configuration determining section 41 as usual. The cell relation configuration determining section 41 is thus a means for establishing a cell relation configuration for the user equipment.

The result is forwarded to a control section 49 in the positioning node 45. The control section 49 constitutes a means for determining a polygon related to the cell relation configuration as defining an area in which the user equipment is positioned. The determination is based on the position determination assisting data. When a positioning request 51 is received, e.g. a so-called Location Reporting Control message over the RANAP interface 47, the control section 49 may, based on quality of service parameters and UE capability, request a position determination by retrieving an area definition from the area storage 44, which corresponds to the present cell relation configuration of the UE. The achieved area definition, preferably a polygon definition is included in a positioning reporting message 52, which typically is sent back over the RANAP interface 47 using e.g. a so-called Location Report message. As in the phase of creating the position determination assisting data, auxiliary information, such as time or utilised RAB, and other auxiliary measurements can also be used to refine the selection of the area definition. Such data is achieved by the auxiliary information section 54.

If the area definitions are to be used together with any additional positioning method, the retrieved area from the area storage 44 is provided to the high-precision positioning section 46 or the medium-precision positioning section 48, depending on the method to be used. The final determined position is then provided to the control section 49 for further reporting.

The arrangements described in connection with FIG. 18 are typically comprised in a node of a cellular communications network (100). Such a node can e.g. be a base station, a base station controller, a radio network controller, a service mobile location centre, or a stand alone service mobile location centre.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

APPENDIX A

Clustering

It is assumed that the cell relation configuration is based on the active list of cells, i.e. cells active in soft handover. Corresponding modelling is possible also for other cluster selection rules.

The high-precision position measurements are typically obtained expressed in the WGS 84 geographical reference system. The measurements that are available at time t are denoted $$(lat_j(t_j) long_j(t_j))^T, j=1, \ldots, N(t), \quad (1)$$

where $lat_j(t_j)$ and $long_j(t_j)$ denote the measured latitude and longitude, respectively, at the time $t_j$. $N(t)$ denotes the total number of available measurements at time t. $(\ )^T$ denotes matrix/vector transpose.

At the same time $t_j$ (to within some reasonable accuracy in time), the cell relation configuration is sampled for cell identities. The result is the row vector (or pointer)

$$Configuration(t_j)=(cID_1(t_j) cID_2(t_j) \ldots cID_{N(t_j)}(t_j)), \quad (2)$$

where $cID_l(t_j)$ is the cell identity of the l:th strongest cell in e.g. softer handover, for the UE for which high-precision positioning was performed at time $t_j$. $N(t_j)$ is the number of cells in the cell relation configuration at time $t_j$.

An arbitrary possible pointer used for clustering of measurements, defined according to (2), is now denoted by $$Pointer_k=(Index_1(k) \ldots Index_{N(k)}(k)), k=1, \ldots, K \quad (3)$$

where $Index_l(k)$ is the l:th component of the (fix) pointer k, $N(k)$ is the dimension of the pointer k and K is the number of counters. The corresponding list of high-precision position measurements is denoted by $List_k$. At time t:

$$List_k(t) = \begin{pmatrix} lat_{k,1}(t_{k,1}) & lat_{k,2}(t_{k,2}) & \ldots & lat_{k,M(k,t)}(t_{k,M(k,t)}) \\ long_{k,1}(t_{k,1}) & long_{k,2}(t_{k,2}) & \ldots & long_{k,M(k,t)}(t_{k,M(k,t)}) \\ t_{k,1} & t_{k,2} & \ldots & t_{k,M(k,t)} \end{pmatrix}, \quad (4)$$

where $M(k,t)$ denotes the number of high-precision measurements of list k at time t. As stated above, measurements that are older than a pre-specified threshold are discarded from each list. The maximum size of a list can also be pre-specified, in which case the oldest measurement is discarded irrespective of its age when a new measurement arrives.

When a new high-precision measurement and corresponding cell relation configuration is obtained at time $t_{N(t)+1}$ the clustering algorithm operates as follows:

```
For k = 1 to K
    If Pointer_k = Configuration(t_N(t)+1)
```

$$List_k(t_{N(k)+1}) = \begin{pmatrix} List_k(t) \begin{pmatrix} lat_{N(t)+1}(t_{N(t)+1}) \\ long_{N(t)+1}(t_{N(t)+1}) \\ t_{N(t)+1} \end{pmatrix} \end{pmatrix}$$

```
    end
    else
        do nothing
    end
end
```

APPENDIX B

Polygon Computation

Notation

In order to facilitate an effective algorithmic description, the following notation is needed:

$p=(p_1 \ldots p_N)$—one specific pointer, corresponding to a specific cell relation configuration.

$r_{i,ll}^P=(x_{i,ll}^P \ y_{i,ll}^P)^T, i=1, \ldots, N_p$—the polygon corners corresponding to the cell relation configuration p in WGS 84 latitude longitude notation.

$r_i^P=(x_i^P \ y_i^P)^T, i=1, \ldots, N_p$—the polygon corners corresponding to the cell relation configuration p in a local earth tangential Cartesian coordinate system, with the origin somewhere in the coverage area of the cellular system. Coordinate axes are usually east and north, disregarding the altitude.

$r_{j,ll}^{m,p}=(x_{j,ll}^{m,p} \ y_{j,ll}^{m,p}), j=1, \ldots, N_p^m$—the high-precision measurements used in order to determine the corners of the polygon corresponding to the cell relation configuration p. Note that this measurements corresponds to one of the entries of $List_k$ that corresponds to p.

$r_j^{m,p}=(x_j^{m,p} \ y_j^{m,p}), j=1, \ldots, N_p^m$—the high-precision measurements used in order to determine the corners of the polygon corresponding to the cell relation configuration p. The high-precision measurements are transformed to the same local earth tangential Cartesian coordinate system, with the origin somewhere in the coverage area of the cellular system, which is used above.

$C^p$—The specified confidence of the polygon corresponding to p. This value corresponds to the probability that the UE is located within the polygon, when the cell relation configuration corresponds to p.

$A^p$—The area of the polygon corresponding to p.

$P^p$—The region defined by the polygon.

Coordinate Transformations

The procedure starts by a transformation of all high-precision measurements corresponding to p to the local earth tangential Cartesian coordinate system, in which all computations are performed. Only the new measurements, which have not already been transformed need to be processed.

Constrained Cell Area Minimization Problem

The principle behind the computation of the polygon is governed by the following three ideas.

The area of the polygon should be as small as possible, thereby maximizing the accuracy.

The constraint of the confidence value should be maintained, for the high-precision measurements available.

Basic geometrical constraints on the polygon should be maintained, in particular the requirement that the polygon should not be allowed to intersect itself, and that the last numbered corner point is connected to the first (closeness).

The following minimization problem can then be set up for the computation of the corners of the polygon:

$$\{\hat{r}_1^p, \ldots, \hat{r}_{N_p}^p\} = \underset{r_1^p, \ldots, r_{N_p}^p}{\operatorname{argmin}} A^p(r_1^p, \ldots, r_{N_p}^p) \qquad (5a)$$

subject to polygonal geometric constraints and (5b)

$$\sum_{\substack{j=1 \\ r_j^{m,p} \in P^p}}^{N_p^m} 1 \geq C^p N_p^m. \qquad (5c)$$

This is a nonlinear optimization problem. In the following, an algorithm is disclosed, that is based on a direct approach, not solving (5a-c) exactly, but approximately in a stepwise manner.

Shrinking Polygon Algorithm

The main idea of this algorithm is to start with an initial polygon that contains all the high-precision measurements collected for the particular cell relation configuration within the initial polygon. The initial polygon can e.g. be calculated from the centre of gravity of the high-precision measurements, followed by a calculation of the maximum distance from this centre of gravity, for all high-precision measurements. This defines a circle that contains all high-precision measurement points. The initial polygon is then selected to contain this circle.

Following this initial step, the area of the polygon is then reduced in steps, by movement of one selected corner point of the polygon inwards towards the momentary centre of gravity, so that one high-precision measurement point is eliminated from the interior of the polygon, for each step. The area reduction is performed so that the area reduction, at each step, is maximized over all corner points, at the same time as the constraints are maintained.

Centre of Gravity

Since the high-precision measurements are treated as points (non-stochastic), the centre of gravity is the arithmetic mean, i.e.

$$r_{CG} = (x_{CG} \quad y_{CG}) = \frac{1}{N_p^{m,rem}} \sum_{q=1}^{N_p^{m,rem}} (x_q^{m,p,rem} \quad y_q^{m,p,rem})^T, \qquad (6)$$

where the superscript $^{rem}$ indicates high-precision measurements that have not yet been removed from the interior of the shrinking polygon by the shrinking polygon algorithm.

Initiation

Since the initiation of the algorithm normally only affects the $N_p$ first steps of the algorithm, a conservative approach is taken here. The first step is to compute the maximum distance from the centre of gravity, i.e.

$$j_{max}^p = \max_j \sqrt{(x_j^{m,p} - x_{CG})^2 + (y_j^{m,p} - y_{CG})^2} \qquad (7)$$

$$r^p = \sqrt{(x_j^{m,p} - x_{CG})^2 + (y_j^{m,p} - y_{CG})^2}. \qquad (8)$$

Hence all high-precision measurements are now within a distance $r^p$ of the centre of gravity. Note that if a finite number of polygon corner points would be spread out around this circle, there is no guarantee that the polygon contains all high-precision measurement points.

Figure 10:
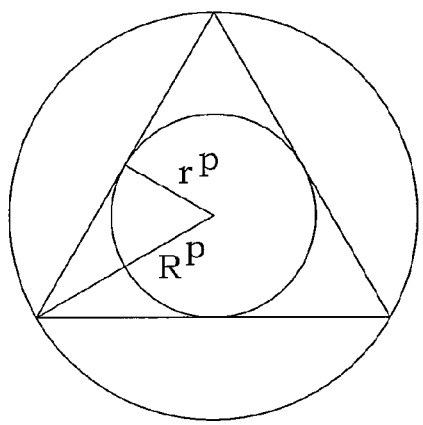
FIG. 10 is an in illustration of an initial geometry for a shrinking polygon method.

Since initial points, symmetrically spread around a circle, is attractive, an additional outer circle is determined, such that it contains the simplest polygon with three corners that contains the circle with radius $r^p$, see FIG. 10. The initial polygon corner points can then be spread out around this outer circle with radius $R^p$. It is geometrically obvious that the largest outer circle is obtained for a polygon defined by the minimum amount of corners, 3.

The outer radius can now be related to the computed inner radius by consideration of FIG. 10. Geometrical symmetry shows that $$R^p = \frac{r^p}{\sin(30)} = 2r^p. \qquad (9)$$

The initial polygon corner points $\{r_i^{p,0}\}_{i=1}^{N_p}$ can then be distributed around the outer circle according to $$x_i^{p,0} = x_{CG} + R^p \cos\left(360 \frac{(i-1)}{N_p}\right) \qquad (10)$$

$$y_i^{p,0} = y_{CG} + R^p \sin\left(360 \frac{(i-1)}{N_p}\right). \qquad (11)$$

Other strategies are of course also possible.

Maximum Corner Movement

Note that the computations described in this subsection consider high-precision measurement points the remains in the interior of the shrinking polygon, at each iteration step. This is true for (12)-(21) and for (24)-(26), see below.

Movement with Respect to High-Precision Measurement Points

In order to assess which polygon corner that is most beneficial to move inwards at a given iteration step, it is first necessary to determine what the maximum movement is. This needs to take two constraints into account.

The second high-precision point that leaves the polygon when a specific corner point is moved inward along the specified direction towards the centre of gravity constrains the movement inwards. This requires a search over all high-precision measurement points that remain inside the polygon at the specific iteration step of the algorithm.

The first polygon line segment that is intersected when a specific corner point is moved inward along the specified direction towards the centre of gravity constrains the move inwards. This requires a search over all line segments (between polygon corner points) of the polygon.

Both these constraints need to be checked. Together they determine the inward maximum movement.

Figure 11:
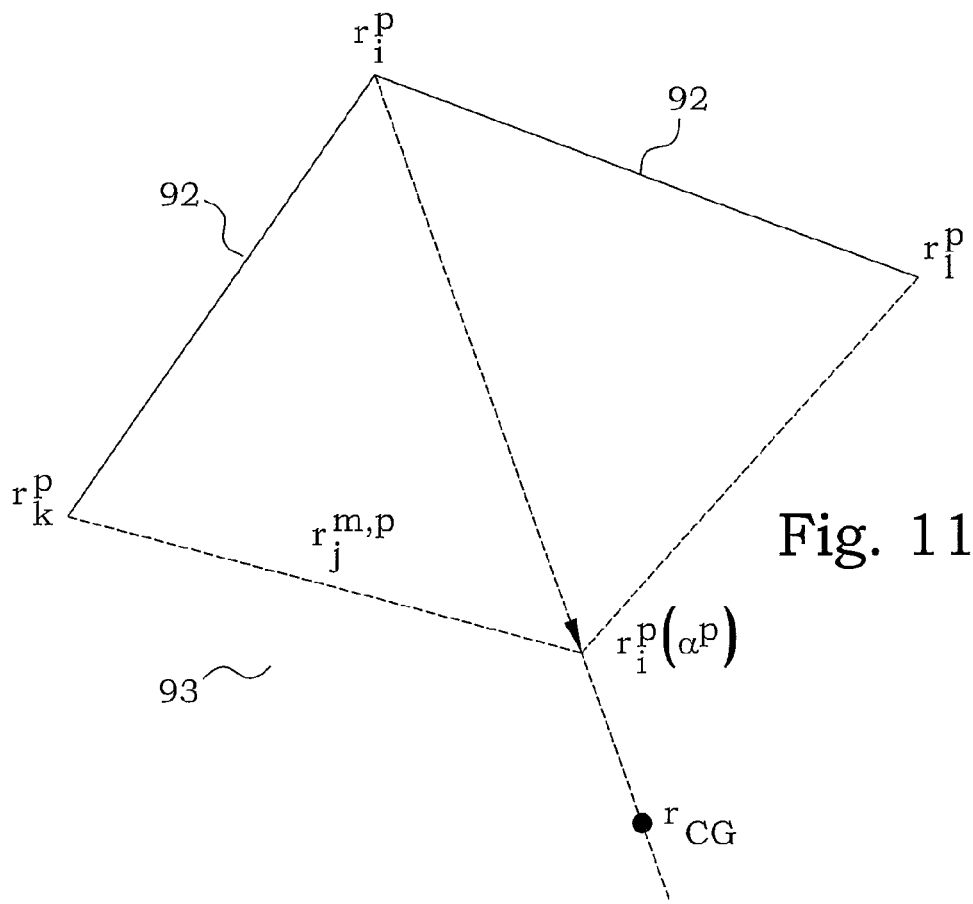
FIG. 11 is an illustration of the geometry used for determining a maximum polygon corner movement.

The maximum polygon corner movement with respect to a specific high-precision measurement point can be determined as follows, referring to FIG. 11. That figure shows a situation with three adjacent polygon corners $r_k^p$, $r_i^p$, $r_l^p$. The arbitrary numbering is due to the need to cover up for the fact that the last and the first of the polygon corner points are connected.

The middle point $r_i^p$ is then moved inwards towards the centre of gravity, i.e. into the interior 93 of the polygon. As a consequence the line segments 92 that connect $r_k^p$ and $r_i^p$, as well as $r_i^p$ and $r_l^p$ also move. At some point of the movement the considered high-precision measurement point may be intersected by either of these two line segments—both needs to be checked.

In order to determine a tentative point of intersection the movement of $r_i^p$ is computed to be $$r_i^p(\alpha^p) = r_i^p + \alpha^p(r_{CG} - r_i^p) \quad (12)$$

Here $\alpha^p$ is a scalar parameter that varies between 0 and 1 when $r_i^p(\alpha)$ moves between $r_i^p$ and $r_{CG}$. Note that this is a standard way to describe a line segment mathematically. Note also that movement may in this case extend beyond the centre of gravity.

A necessary (but not sufficient) requirement for an intersection of the moving boundary of the polygon with the considered high-precision measurement point, is that $r_i^p(\alpha^p) - r_k^p$ and $r_j^{m,p} - r_k^p$ become parallel, or that $r_i^p(\alpha^p) - r_l^p$ and $r_j^{m,p} - r_l^p$ become parallel. Exploiting the fact that the cross product between parallel vectors is zero, allows for a computation of $\alpha^p$. Straightforward algebra gives the results:

$$\alpha_{ik}^{j,p} = \frac{-(x_i^p - x_k^p)(y_j^{m,p} - y_k^p) + (x_j^{m,p} - x_k^p)(y_i^p - y_k^p)}{(x_{CG} - x_i^p)(y_j^{m,p} - y_k^p) - (x_j^{m,p} - x_k^p)(y_{CG} - y_i^p)} \quad (13)$$

$$\alpha_{il}^{j,p} = \frac{-(x_i^p - x_l^p)(y_j^{m,p} - y_l^p) + (x_j^{m,p} - x_l^p)(y_i^p - y_l^p)}{(x_{CG} - x_i^p)(y_j^{m,p} - y_l^p) - (x_j^{m,p} - x_l^p)(y_{CG} - y_i^p)}. \quad (14)$$

The subscripts indicate the polygon corner points that define the line segment under evaluation. The superscript denotes the index of the high-precision measurement point. Both (13) and (14) are candidates for being an active constraint. Note however, that a requirement for this is that $$\alpha_{ik}^{j,p} > 0 \quad (15)$$

$$\alpha_{il}^{j,p} > 0 \quad (16)$$

In case (15) and (16) do not hold, the corresponding intersection strategy needs to be discarded.

Assuming that (15) and (16) hold, it remains to check if the intersection point falls between the points that limit the line segment of the polygon. This means that the following equations need to be fulfilled, for some $\beta_{ik}^{j,p} \in [0,1]$ or $\beta_{il}^{j,p} \in [0,1]$:

$$r_j^{m,p} = r_i^p(\alpha_{ik}^{j,p}) + \beta_{ik}^{j,p}(r_k^p - r_i^p) \quad (17)$$

$$r_j^{m,p} = r_i^p(\alpha_{il}^{j,p}) + \beta_{il}^{j,p}(r_l^p - r_i^p) \quad (18)$$

Since the vectors leading to (13) and (14) are parallel, it is enough to consider one of the coordinates of (17) and (18) when solving for $\beta^p$. The results are:

$$\beta_{ik}^{j,p} = \frac{x_j^{m,p} - x_i^p(\alpha_{ik}^{j,p})}{x_k^p - x_i^p(\alpha_{ik}^{j,p})} \quad (19)$$

$$\beta_{il}^{j,p} = \frac{x_j^{m,p} - x_i^p(\alpha_{il}^{j,p})}{x_l^p - x_i^p(\alpha_{il}^{j,p})}. \quad (20)$$

The final logic needed in the evaluation of the point $r_j^{m,p}$, with respect to the movement of $r_i^p$, can be briefly summarized as follows. Provided that:

$\alpha_{ik}^{j,p} > 0$ and $0 < \beta_{ik}^{j,p} < 1$, $\alpha_{ik}^{j,p}$ represents a feasible maximum movement for the line segment between $r_i^p$ and $r_k^p$.

$\alpha_{ik}^{j,p} > 0$ and $\beta_{ik}^{j,p} > 1 \lor \beta_{ik}^{j,p} < 0$, $\alpha_{ik}^{j,p}$ represents an inward point but the feasible maximum movement is not relevant since the intersection is outside the line segment between $r_i^p$ and $r_k^p$. In this case the inward movement shall not limit the minimum allowed inward movement. This is accomplished by setting $\alpha_{ik}^{j,p} = \alpha_{max}$, where $\alpha_{max}$ is a large inward movement, say 10.

$\alpha_{ik}^{j,p} < 0$ and $0 < \beta_{ik}^{j,p} < 1$, $\alpha_{ik}^{j,p}$ represents a feasible maximum movement for the line segment between $r_i^p$ and $r_k^p$. However, since it is an outward movement, it shall be set to zero since the algorithm is designed for inward movement.

$\alpha_{il}^{j,p} > 0$ and $0 < \beta_{il}^{j,p} < 1$, $\alpha_{il}^{j,p}$ represents a feasible maximum movement for the line segment between $r_i^p$ and $r_l^p$.

$\alpha_{il}^{j,p} > 0$ and $\beta_{il}^{j,p} > 1 \lor \beta_{il}^{j,p} < 0$, $\alpha_{il}^{j,p}$ represents an inward point but the feasible maximum movement is not relevant since the intersection is outside the line segment between $r_i^p$ and $r_k^p$. In this case the inward movement shall not limit the minimum allowed inward movement. This is accomplished by setting $\alpha_{il}^{j,p} = \alpha_{max}$ where $\alpha_{max}$ is a large inward movement, say 10.

$\alpha_{il}^{j,p} < 0$ and $0 < \beta_{il}^{j,p} < 1$, $\alpha_{il}^{j,p}$ represents a feasible maximum movement for the line segment between $r_i^p$ and $r_k^p$. However, since it is an outward movement, it shall be set to zero since the algorithm is designed for inward movement.

In case both $\alpha_{ik}^{j,p}$ and $\alpha_{il}^{j,p}$ are feasible maximum movements, the smallest one is chosen. The considered cases can be summed as follows:

$$\alpha_i^{j,p} = \begin{cases} \alpha_{max}, & \alpha_{ik}^{j,p} < 0, \ \alpha_{il}^{j,p} > 0, \ \beta_{ik}^{j,p} \notin [0,1], \ \beta_{il}^{j,p} \notin [0,1] \\ \alpha_{il}^{j,p} & \alpha_{ik}^{j,p} < 0, \ \alpha_{il}^{j,p} > 0, \ \beta_{ik}^{j,p} \notin [0,1], \ \beta_{il}^{j,p} \in [0,1] \\ \alpha_{max} & \alpha_{ik}^{j,p} < 0, \ \alpha_{il}^{j,p} > 0, \ \beta_{ik}^{j,p} \in [0,1], \ \beta_{il}^{j,p} \notin [0,1] \\ \alpha_{il}^{j,p} & \alpha_{ik}^{j,p} < 0, \ \alpha_{il}^{j,p} > 0, \ \beta_{ik}^{j,p} \in [0,1], \ \beta_{il}^{j,p} \in [0,1] \\ \alpha_{max} & \alpha_{ik}^{j,p} > 0, \ \alpha_{il}^{j,p} < 0, \ \beta_{ik}^{j,p} \notin [0,1], \ \beta_{il}^{j,p} \notin [0,1] \\ \alpha_{max} & \alpha_{ik}^{j,p} > 0, \ \alpha_{il}^{j,p} < 0, \ \beta_{ik}^{j,p} \notin [0,1], \ \beta_{il}^{j,p} \in [0,1] \\ \alpha_{ik}^{j,p} & \alpha_{ik}^{j,p} > 0, \ \alpha_{il}^{j,p} < 0, \ \beta_{ik}^{j,p} \in [0,1], \ \beta_{il}^{j,p} \notin [0,1] \\ \alpha_{ik}^{j,p} & \alpha_{ik}^{j,p} > 0, \ \alpha_{il}^{j,p} < 0, \ \beta_{ik}^{j,p} \in [0,1], \ \beta_{il}^{j,p} \in [0,1] \\ \alpha_{max} & \alpha_{ik}^{j,p} > 0, \ \alpha_{il}^{j,p} > 0, \ \beta_{ik}^{j,p} \notin [0,1], \ \beta_{il}^{j,p} \notin [0,1] \\ \alpha_{il}^{j,p} & \alpha_{ik}^{j,p} > 0, \ \alpha_{il}^{j,p} > 0, \ \beta_{ik}^{j,p} \notin [0,1], \ \beta_{il}^{j,p} \in [0,1] \\ \alpha_{ik}^{j,p} & \alpha_{ik}^{j,p} > 0, \ \alpha_{il}^{j,p} > 0, \ \beta_{ik}^{j,p} \in [0,1], \ \beta_{il}^{j,p} \notin [0,1] \\ \min\begin{pmatrix} \alpha_{ik}^{j,p}, \\ \alpha_{il}^{j,p} \end{pmatrix} & \alpha_{ik}^{j,p} > 0, \ \alpha_{il}^{j,p} > 0, \ \beta_{ik}^{j,p} \in [0,1], \ \beta_{il}^{j,p} \in [0,1] \\ 0 & \text{otherwise} \end{cases} \quad (21)$$

Note that some of the listed cases may never occur. This is of less consequence in case the computations are implemented in a consecutive way, following the order of presentation of this document.

Movement with Respect to Polygon Line Segments

The intersection between the line of movement as given by (12), and the line segment between $r_m^p$ and $r_n^p$, is given by the solution to the following system of equations, which is solved with respect to the parameters $\alpha_{i,mn}^p$ and $\gamma_{mn}^p$, where the subscript refer to the points involved in the computation $$r_i^p + \alpha_{i,mn}^p(r_{CG} - r_i^p) = r_m^p + \gamma_{mn}^p(r_n^p - r_m^p) \quad (22)$$

$$\Leftrightarrow ((r_{CG} - r_i^p) - (r_n^p - r_m^p))\begin{pmatrix} \alpha_{i,mn}^p \\ \gamma_{mn}^p \end{pmatrix} = r_m^p - r_i^p.$$

The solution shall not be computed for the points adjacent to $r_i^p$. Furthermore, the intersection between the two lines fall outside the relevant line segment between $r_m^p$ and $r_n^p$ in case $\gamma_{mn}^p \notin [0,1]$. If this is the case the intersection shall be disregarded in the evaluation of the corner $r_i^p$. The requirement that $\alpha_{i,mn}^p > 0$ also remains. Note also that it is only needed to solve (22) once for each corner point and iteration step of the algorithm.

To obtain the complete picture, (22) is first solved for all line segments, excluding the ones that are adjacent to $r_i^p$. The solution with the minimum value of $\alpha_{i,mn}^p$, such that $\alpha_{i,mn}^p > 0$ and $\gamma_{mn}^p \in [0,1]$, is expressed as (note that since the movement is inward such a solution always exists)

$$\alpha_{i,m_0 n_0}^p, \gamma_{m_0 n_0}^p \quad (23)$$

Combination

Since all high-precision measurement points are evaluated along the same direction as far as constraints are concerned, they can be directly combined. Note also that since one point is to be removed from the interior of the polygon for each iteration step, the limiting high-precision measurement point is to be selected as the second one that becomes active. The high-precision measurement point that becomes an active constraint is hence given by (24), where (24) can be calculated as follows $$j_{first} = \underset{\substack{j \\ r_j^{m,p} \in P^p}}{\arg\min} \alpha_i^{j,p} \quad (24)$$

$$j_{activeConstraint} = \underset{\substack{j \neq j_{first} \\ r_j^{m,p} \in P^p}}{\arg\min} \alpha_i^{j,p},$$

The corresponding movement becomes $$\alpha_i^{p,measurementConstraints} = \alpha_i^{j_{activeConstraint},p}. \quad (25)$$

The result (25) is finally combined with the constraint imposed by the possibility of self-intersection $$\alpha_i^{p,allConstraints} = \min(\alpha_i^{p,measurementConstraints}, \alpha_{i,m_0 n_0}^p) - \epsilon, \quad (26)$$

where $\epsilon$ is a small number that prevents that the constraint becomes exactly active, so that the search is started outside the constraining point in the next iteration step.

Obtained Polygon Area Reduction

Figure 12:
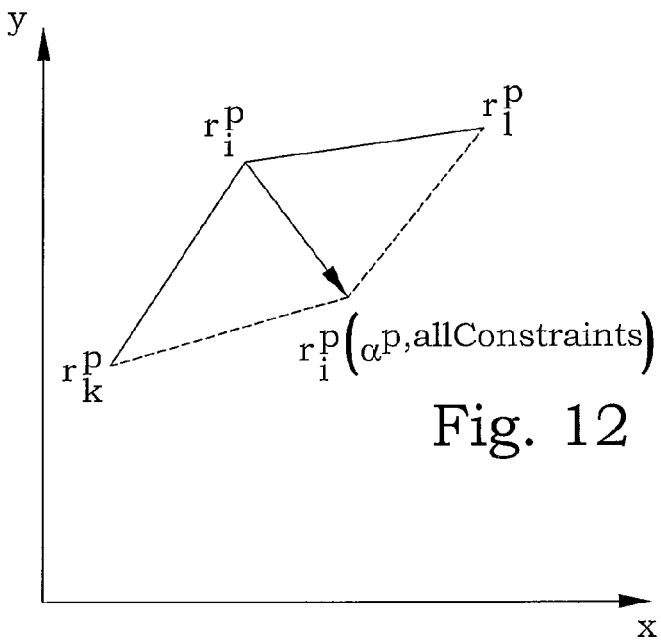
FIG. 12 is an illustration of the geometry for calculation of the area reduction.

The obtained are reduction follows by integration, or equivalently, computation of the areas under the parts of the polygon shown in FIG. 12.

By consideration of the facts that the area under the curve can be computed as sums of areas of rectangles and triangles, it is only the areas related to the moving and adjacent points that are affected by the movement, it follows that the areas before and after movement can be expressed as:

$$A_{i,before}^p = A_0 + \frac{1}{2}(x_i^p - x_k^p)(y_k^p + y_i^p) + \frac{1}{2}(x_l^p - x_i^p)(y_i^p + y_l^p) \quad (27)$$

$$A_{i,after}^p = A_0 + \frac{1}{2}(x_i^p(\alpha_i^{p,allConstraints}) - x_k^p)(y_k^p + y_i^p(\alpha_i^{p,allConstraints})) + \quad (28)$$
$$\frac{1}{2}(x_l^p - x_i^p(\alpha_i^{p,allConstraints}))(y_i^p(\alpha_i^{p,allConstraints}) + y_l^p).$$

The reduction of area obtained is hence given by $$\Delta A_i^{p,allConstraints} = \begin{vmatrix} \frac{1}{2}(x_i^p - x_k^p)(y_k^p + y_i^p) + \frac{1}{2}(x_l^p - x_i^p) \\ (y_i^p + y_l^p) - \frac{1}{2}(x_i^p(\alpha_i^{p,allConstraints}) - x_k^p) \\ (y_k^p + y_i^p(\alpha_i^{p,allConstraints})) - \\ \frac{1}{2}(x_l^p - x_i^p(\alpha_i^{p,allConstraints})) \\ (y_i^p(\alpha_i^{p,allConstraints}) + y_l^p) \end{vmatrix}. \quad (29)$$

The maximum of this area reduction measure determines which of the $N_p$ corners to move at a specific iteration, whereas (12) and (26) determine the movement.

The Algorithm

In the algorithm below $N_p^{m,rem}$ denotes the number of high-precision measurement points that remain in the interior of the polygon, at each corner movement iteration step. The algorithm for polygon computation, for one specific cell relation configuration p is then:

Initialization:
  Compute the centre of gravity of all high-precision measurements of the cluster (6).
  Compute the maximum distance r from the centre of gravity (7), (8).
  Compute the initial polygon distributed around the circle R(9), (10), (11).
Area Minimization:
  Repeat until $N_p^{m,rem} < C^p N_p^m$ or $\alpha_i^{p,allConstraints} \leq 0$ (Measurement removal loop).
  Compute the centre of gravity for the points that remain in the interior of the polygon (6).
  For i=1 to $N_p$ (Corner movement evaluation loop).
    For j=1 to $N_p^{m,rem}$ (Measurement point constraint evaluation loop).
      Compute and store allowed, point-wise constrained, corner movement (21).
    End (Measurement point constraint evaluation loop).
    Compute and store allowed combined, measurement constrained, movement (24), (25).
    Compute and store allowed, self-intersection constrained, movement (23).
    Compute and store combined allowed, measurement and self-intersection constrained, movement (26).
    Compute and store area reduction (29), corresponding to (26).
  End (Corner movement evaluation loop).
  Find the corner with index $i_0$ corresponding to the maximum area reduction.
  Update (12) the corner $i_0$ with the movement $\alpha_{i_0}^{p,allConstraints}$.
  Remove the high-precision measurement point that is no longer in the interior of the polygon, from any lists of interior points.
  $N_p^{m,rem} := N_p^{m,rem} - 1$.
End (Measurement removal loop).
Transform the final corner points of the polygon to WGS 84c latitudes and longitudes.

Re-Initiation of Corner Point Positions
Step 1—Calculation of Distances Between Polygon Corner Points The corners of the estimated polygon are denoted by:

$$r_i^p = (x_i^p y_i^p)^T, \; i=1, \ldots, N^p, \quad (30)$$

Where it is assumed that the corners are expressed in a Cartesian coordinate system. $(\;)^T$ denotes vector and matrix transpose. The distances between adjacent corners of the estimated polygon then follow as:

$$d_i^p = \sqrt{(x_i^p - x_{i+1}^p)^2 + (y_i^p - y_{i+1}^p)^2}, \; i=1, \ldots, N^p-1, \quad (31a)$$

$$d_{N^p}^p = \sqrt{(x_{N^p}^p - x_1^p)^2 + (y_{N^p}^p - y_1^p)^2}. \quad (31b)$$

The total distance around the boundary of the polygon hence is:

$$d^p = \sum_{i=1}^{N^p} d_i^p. \quad (32)$$

Similarly the vectors between adjacent points become $$\Delta r_i^p = \begin{pmatrix} x_{i+1}^p \\ y_{i+1}^p \end{pmatrix} - \begin{pmatrix} x_i^p \\ y_i^p \end{pmatrix}, \quad (33a)$$

$$i = 1, \ldots, N^p - 1,$$

$$\Delta r_{N^p}^p = \begin{pmatrix} x_1^p \\ y_1^p \end{pmatrix} - \begin{pmatrix} x_{N^p}^p \\ y_{N^p}^p \end{pmatrix}. \quad (33b)$$

Step 2—Calculation of Integer and Fractional Corners to Pass

Since the re-sampling is performed by a procedure that starts at corner 1 and then adds vectors to the next corner, at each iteration, it is a necessary pre-requisite to know the number of corners to pass on the original polygon, as well as the fraction of the distance to the next corner to go, after passing the last corner. These quantities can be calculated by the following scheme, where $n_i^{p,int}$ denotes the number of corners to pass and where $n_i^{p,frac}$ denotes the fraction of the vector to add after passing $n_i^{p,int}$. The index i refers to the i:th point that is re-sampled. The quantity $d^{p,target}$ is the distance to move around the polygon boundary to place the i:th new corner, $d^{p,accumulated}$ and $d^{p,accumulated,new}$ are old and new accumulated distances during the corner placement. The algorithms are:

$$n_i^{p,int} = 0, \; i = 1, \ldots, N^p \quad (34)$$
$$n_i^{p,frac} = 0, \; i = 1, \ldots, N^p$$
For i = 1, ..., $N^p$ $\quad d^{p,target} = (i-1)\dfrac{d^p}{N^p}$, % Mean separation used for movement $\quad d^{p,accumulated} = 0$
$\quad d^{p,accumulated,new} = 0$
$\quad$ While ($d^{p,accumulated,new} < d^{p,target}$)
$\quad\quad (d^{p,accumulated,new} = d^{p,accumulated} + d_{n_i^{p,int}+1}^p$
$\quad\quad$ If ($d^{p,accumulated,new} < d^{p,target}$)
$\quad\quad\quad n_i^{p,int} = n_i^{p,int} + 1$
$\quad\quad\quad d^{p,accumulated} = d^{p,accumulated,new}$
$\quad\quad$ Else $$n_i^{p,frac} = \frac{(d^{p,target} - d^{p,accumulated})}{d_{n_i^p+1}^{p,int}}$$

$\quad\quad$ End
$\quad$ End
End.

Step 3—Calculation of New Polygon Corners

The re-sampled corners of the polygon are first re-sampled in the first corner of the original estimated polygon:

$$r_i^{p,Resampled,0} = (x_1^p y_1^p)^T, \; i=1, \ldots, N^p. \quad (35)$$

Then the re-sampled corners follow as:

$$r_i^{p,Resampled} = \sum_{j=1}^{n_i^{p,int}} \Delta r_i^p + n_i^{p,frac} \Delta r_i^p, \quad (36)$$

$$i = 1, \ldots, N^p.$$

Step 4—Calculation of Interior Points and Confidence of Re-Sampled Polygon.

Since the corners of the polygon have changed, so has the polygon. A consequence is that the running value of the experimental confidence (the fraction of the cluster points that are interior points of the estimated polygon) has also changed.

In order for the shrinking polygon algorithm to continue to run, or to terminate, all points of the cluster need to be checked as to whether they are interior points of the resampled polygon or not. After this the remaining interior points of the shrinking polygon algorithm are reinitiated with these new interior points. Furthermore, the shrinking polygon algorithm needs to be informed about the new value of the experimental confidence.

The checking of each cluster point is done by an algorithm, known from prior art, that determines if a given point is an interior point of an arbitrary polygon. This algorithm operates by forming a test ray (line) originating in the point that is to be checked and extending to infinity. The number of intersections between said test ray and the line segments that form the polygon is then counted. If the number of intersections is an odd number the ray must leave the (bounded) polygon at some point, hence the point needs to have started in the interior of the polygon, i.e. the tested point must be an interior point.

APPENDIX C

Polygon Initiation on Arcs

The here described embodiment is based on a replacement of movement towards the center of gravity of clusters for an antenna point position. The description below is made with respect to the case with KIT measurements. However, strongly non-convex clusters may arise in other situations. The difference is then that another "center point" needs to be selected, towards/from which the corner movement is performed.

Figure 14:
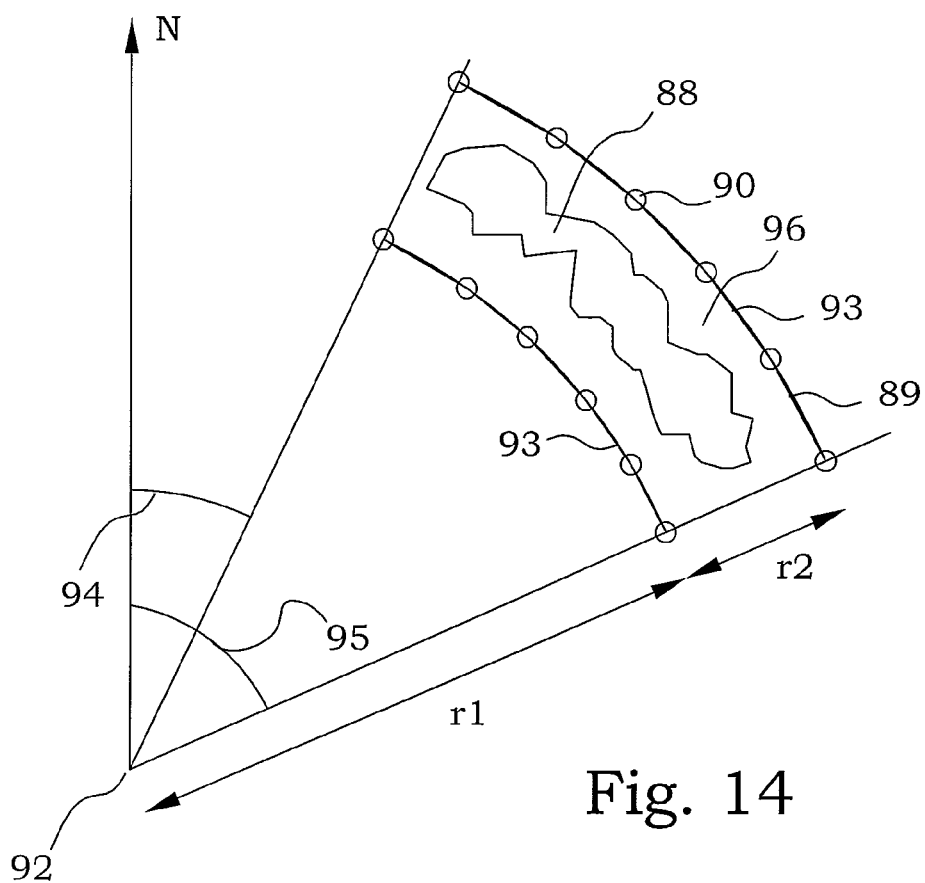
FIG. 14 is an illustration of polygon initiation on two ellipsoidal sectors.

To explain the ellipsoid arc shape of zero thickness, references are made to FIG. 14. As can be seen, an ellipsoid arc 96 is defined by a center point 92, an inner radius r1, an outer radius, defined as the sum of the inner radius and an arc width r2 as well as a left θ angle with respect to the north direction and a right angle, defined as the sum of the left angle and an angle region β.

To explain the modified initiation the following notation is introduced (it is for simplicity assumed that no angular wrap around effects are occurring):

$$r_j^{m,p} = (x_j^m y_j^m)^T, j = 1, \ldots, N_p^m, \quad (37)$$

denote the high precision measurements of the cluster p. Furthermore, the antenna location of the RBS that serves cell p with the specific RTT measurement of the cluster is denoted by $$r_{Center}^P = (x_{Center}^P y_{Center}^P)^T. \quad (38)$$

It is then easy to compute $$r_{max}^p = \max_j \sqrt{(x_j^{m,p} - x_{Center}^p)^2 + (y_j^{m,p} - y_{Center}^p)^2} \quad (39)$$

$$r_{min}^p = \min_j \sqrt{(x_j^{m,p} - x_{Center}^p)^2 + (y_j^{m,p} - y_{Center}^p)^2} \quad (40)$$

$$\theta_{max}^p = \max_j \arctan 2(y_j^{m,p} - y_{Center}^p, x_j^{m,p} - x_{Center}^p) \quad (41)$$

$$\theta_{min}^p = \min_j \arctan 2(y_j^{m,p} - y_{Center}^p, x_j^{m,p} - x_{Center}^p). \quad (42)$$

The quantity $r_{max}^p$ is thereby the maximum distance to the antenna location of any of the high precision measurements. The quantity $r_{min}^p$ is analogously the minimum distance to the antenna location of any of the high precision measurements, $\theta_{max}^p$ is the maximum angle of a connection line between the antenna location and any of the high precision measurements and $\theta_{min}^p$ is the minimum angle of a connection line between the antenna location and any of the high precision measurements. The angles are then adjusted slightly inwards in order to make sure that the points always hit the cluster when they are moved. This is expressed as $$\theta_{max}^{p,adjusted} = \theta_{max}^p - \Delta\theta \quad (43)$$

$$\theta_{min}^{p,adjusted} = \theta_{min}^p + \Delta\theta, \quad (44)$$

Where Δθ is a small angle. It is noted that measures to handle the angular ambiguity with 2π needs to be added.

Defining positive scale factors $k_{max} > 1$ and $k_{min} < 1$, the initial corner points of the polygon can be computed as $$\theta_i^{p,0} = \theta_{min}^{p,adjusted} + \frac{i-1}{N_{Division}^p - 1}(\theta_{max}^{p,adjusted} - \theta_{min}^{p,adjusted}), \quad (45)$$
$$i = 1, \ldots, N_{Division}^p,$$

$$\theta_i^{p,0} = \theta_{max}^{p,adjusted} + \frac{i-1}{N_{Division}^p - 1}(\theta_{min}^{p,adjusted} - \theta_{max}^{p,adjusted}), \quad (46)$$
$$i = N_{Division}^p + 1, \ldots, N^p,$$

$$x_i^{p,0} = x_{Center}^p + k_{max} r_{max}^p \cos(\theta_i^{p,0}), \quad (47)$$
$$i = 1, \ldots, N_{Division}^p,$$

$$y_i^{p,0} = y_{Center}^p + k_{max} r_{max}^p \sin(\theta_i^{p,0}), \quad (48)$$
$$i = 1, \ldots, N_{Division}^p,$$

$$x_i^{p,0} = x_{Center}^p + k_{min} r_{min}^p \cos(\theta_i^{p,0}), \quad (49)$$
$$i = N_{Division}^p + 1, \ldots, N^p,$$

$$y_i^{p,0} = y_{Center}^p + k_{min} r_{min}^p \sin(\theta_i^{p,0}), \quad (50)$$
$$i = N_{Division}^p + 1, \ldots, N^p.$$

$N_{Division}^p$ is the number of polygon points originally situated at the outer ellipsoid arc. $\theta_i^{p,0}$ are the angles of connection lines through the antenna location and the respective polygon points, and $x_i^{p,0}$ and $y_i^{p,0}$ are the coordinates of the polygon points. The principle for corner movement is now easily explained. The corner points $r_i^p$, $i=1, \ldots, N_{Division}^p$ are always moved inward towards $r_{Center}^p$, whereas the corner points $r_i^p$, $i=N_{Division}^p+1, \ldots, N^p$ are always moved outwards from $r_{Center}^p$. In both cases the movement is constrained to a line passing through $r_{Center}^p$ and the corner point. With this modification, the shrinking polygon algorithm operates exactly as described above.

The invention claimed is:

1. A method for providing position determination assisting data in a cellular communications network, comprising the steps of:
    establishing a cell relation configuration for a user equipment, said cell relation configuration comprising at least cell identities of cells, in which signals to or from said user equipment fulfill at least a specific radio condition criterion when received;
    performing a high-precision position determination for said user equipment;
    repeating said establishing and performing steps a plurality of times;
    clustering points that are results of said high-precision position determinations belonging to the same cell relation configuration in separate result clusters;
    associating a polygon with at least one of said result clusters, said associating step in turn comprises the steps of:
        encompassing a first result cluster of said result clusters by a polygon;
        altering the position of corners of said polygon along defined paths being curves through the original corner position and a single point to improve a predetermined criterion while maintaining at least a predetermined percentage of said results of high-precision position determinations of said first result cluster within the polygon; and
        counteracting corners of said polygon from gathering at a minor portion of a circumference of said polygon;
    creating position determination assisting data comprising a relation between said cell relation configurations and said polygon.

2. The method according to claim 1, wherein said single point is a center of gravity for said results of high-precision position determinations of said first result cluster within the polygon and wherein said step of counteracting comprises at least one re-initiation of a polygon encompassing results of high-precision position determinations of said first result cluster.

3. The method according to claim 2, wherein said reinitiated polygon is a polygon having corners distributed evenly along a circumference of the previous polygon and said step of counteracting further comprises recalculation of which points in the original cluster are situated within said reinitiated polygon.

4. The method according to claim 2, wherein said reinitiated polygon is a polygon having corners distributed evenly along a circumference of said reinitiated polygon and encompassing remaining results of high-precision position determinations of said first result cluster.

5. The method according to claim 4, wherein said corners of said reinitiated polygon are situated on an ellipse.

6. The method according to claim 2, wherein said re-initiation is performed intermittently.

7. The method according to claim 6, wherein said re-initiation is performed after a predetermined number of iterations of said altering step.

8. The method according to claim 6, wherein said re-initiation is performed when a measure of uneven corner distribution exceeds a predetermined threshold value.

9. The method according to claim 8, wherein said measure of uneven corner distribution is:

$$\sigma = \frac{\max_i d_i^p}{\min_i d_i^p}$$

where $d_i^p$ are distances between adjacent corners.

10. The method according to claim 1, wherein said step of counteracting comprises selecting said single point as a point outside said polygon encompassing said first result cluster.

11. The method according to claim 10, wherein said polygon encompassing said first result cluster is a polygon having points located at two ellipsoid arc sections centered at said single point.

12. The method according to claim 1, wherein said defined path is a curve through the original corner position and a first point within said first result cluster, and wherein said step of counteracting comprises selecting a closest point of a plurality of points within said first result cluster as said first point for each polygon corner.

13. The method according to claim 1, wherein said step of counteracting comprises selection of said defined path as a curve asymptotically closing up to a path being equidistant to the two closest neighboring corners.

14. The method according to claim 1, wherein said step of counteracting comprised deletion of at least one polygon corner among polygon corners gathering at a minor portion of a circumference of said polygon.

15. The method according to claim 14, wherein said deletion is performed when a measure of uneven corner distribution exceeds a predetermined threshold value.

16. The method according to claim 15, wherein said measure of uneven corner distribution is:

$$\sigma = \frac{\max_i d_i^p}{\min_i d_i^p}$$

where $d_i^p$ are distances between adjacent corners.

17. The method according to claim 1, wherein an area measure of said associated polygon is minimized during said step of altering.

18. The method according to claim 1, wherein said altering step comprises altering of one corner position at a time, allowing one of said high-precision position determinations of said result cluster to be placed outside said polygon, but not two of said high-precision position determinations.

19. The method according to claim 1, wherein said clustering, associating and creating steps are performed continuously or intermittently.

20. A method for radio network planning, comprising the steps of:
obtaining position determination assisting data according to claim 1, wherein said step of performing a high-precision position determination is performed on demand; and
evaluating said position determination assisting data regarding actual radio propagation.

21. A method for determining a position of a user equipment in a cellular communications network, comprising the steps of:
obtaining position determination assisting data according to claim 1;
establishing a cell relation configuration for said user equipment; said cell relation configuration comprising at least cell identities of cells, in which signals to or from said user equipment fulfill at least a specific radio condition criterion when received; and
determining, by said position determination assisting data, a polygon related to said cell relation configuration as defining an area in which said user equipment is positioned.

22. A device for providing position determination assisting data in a cellular communications network, comprising:
a cell relation configuration determining circuit for establishing a cell relation configuration for a user equipment; said cell relation configuration comprising at least cell identities of cells, in which signals to or from said user equipment fulfill at least a specific radio condition criterion when received;
a high-precision position determining circuit for performing a high-precision position determination for said user equipment;
a clustering circuit for clustering points that are results of a plurality of said high-precision position determinations belonging to the same cell relation configuration in separate result clusters; and
a computing circuit for associating a polygon with at least one of said result clusters, said computing circuit being arranged for:
encompassing a first result cluster of said result clusters by a polygon;
altering the position of corners of said polygon along defined paths being curves through the original corner position and a single point to improve a predetermined criterion while maintaining at least a predetermined percentage of said results of high-precision position determinations of said first result cluster within the polygon; and
counteracting corners of said polygon from gathering at a minor portion of a circumference of said polygon; and
an assisting data determining circuit for creating position determination assisting data comprising a relation between said cell relation configurations and said associated polygons.

23. The device of claim 22, further comprising a position determining arrangement configured to determine a position of the user equipment based on the position determination assisting data, said position determining arrangement comprising a control circuit that is configured to determine, by said position determination assisting data, a polygon related to said cell relation configuration as defining an area in which said user equipment is positioned.

24. A node of a cellular communications network, comprising the device of claim 22.

25. The node according to claim 24, wherein the node comprises one of: a base station; a base station controller; a radio network controller; a service mobile location center; and a stand-alone service mobile location center.

* * * * *

UNITED STATES PATENT AND TRADEMARK OFFICE
CERTIFICATE OF CORRECTION

PATENT NO. : 8,494,550 B2
APPLICATION NO. : 12/593151
DATED : July 23, 2013
INVENTOR(S) : Wigren It is certified that error appears in the above-identified patent and that said Letters Patent is hereby corrected as shown below:

On the Title Page, in Item [75], under "Inventor", in Column 1, Line 1, delete "Torbjorn" and insert -- Torbjörn --, therefor.

In the Specification

Column 1, Line 16, delete "softer)" and insert -- soft(er) --, therefor.

Column 5, Line 10, delete "as in" and insert -- an --, therefor.

Column 14, Line 3, delete "WIT" and insert -- RTT --, therefor.

Column 23, Line 3, delete "between r" and insert -- between --, therefor.

Column 23, Line 52, in Equation (25), delete " $\alpha_i^{p,measurenmentConstraints}=$ " and insert -- $\alpha_i^{p,measurementConstraints}=$ --, therefor.

Column 23, Line 57, in Equation (26), delete " $\min(\alpha_i^{p,measurenmentConstraints}, \alpha_{i,m_0n_0}^P)-\epsilon,$ " and insert -- $\min(\alpha_i^{p,measurementConstraints}, \alpha_{i,m_0n_0}^P)-\epsilon,$ --, therefor.

Column 24, Line 60, delete " $\alpha_{i_0}^{p,allConstrants}$ " and insert -- $\alpha_{i_0}^{p,allConstraints}$ --, therefor.

Column 26, Line 59, delete "KIT" and insert -- RTT --, therefor.

Signed and Sealed this
Sixteenth Day of September, 2014

Michelle K. Lee
*Deputy Director of the United States Patent and Trademark Office*